(12) United States Patent
Li et al.

(10) Patent No.: US 11,356,221 B2
(45) Date of Patent: Jun. 7, 2022

(54) DATA TRANSMISSION METHOD, DEVICE, AND SYSTEM

(71) Applicant: Huawei Technologies Co., Ltd., Shenzhen (CN)

(72) Inventors: Jun Li, Shanghai (CN); Zhe Chen, Shenzhen (CN); Xiaolei Tie, Shanghai (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/786,501

(22) Filed: Feb. 10, 2020

(65) Prior Publication Data
US 2020/0177337 A1 Jun. 4, 2020

Related U.S. Application Data

(63) Continuation of application No. PCT/CN2018/079041, filed on Mar. 14, 2018.

(30) Foreign Application Priority Data

Aug. 10, 2017 (CN) .......................... 201710682622.0

(51) Int. Cl.
*H04L 5/00* (2006.01)
*H04J 11/00* (2006.01)
(Continued)

(52) U.S. Cl.
CPC ........ *H04L 5/0048* (2013.01); *H04J 11/0073* (2013.01); *H04J 11/0076* (2013.01);
(Continued)

(58) Field of Classification Search
CPC ... H04L 5/0048; H04L 5/1469; H04L 5/0092; H04L 5/0053; H04J 11/0073;
(Continued)

(56) References Cited

U.S. PATENT DOCUMENTS

2016/0165465 A1 6/2016 Park et al.
2017/0150430 A1 5/2017 Luo et al.
(Continued)

FOREIGN PATENT DOCUMENTS

CN 106576372 A 4/2017
CN 107006002 A 8/2017
(Continued)

OTHER PUBLICATIONS

St. Julian's Malta, Synchronization signal design for NB-IoT, Feb. 2016, Nokia Networks, Alcatel-Lucent Shanghai Bell, 7 pgs (Year: 2016).*

(Continued)

*Primary Examiner* — Joseph E Dean, Jr.
(74) *Attorney, Agent, or Firm* — Leydig, Voit & Mayer, Ltd.

(57) ABSTRACT

A data transmission method, device, and system are provided. The method includes: sending, by a base station, an NPSS to UE by using a first subframe in a first radio frame and a first subframe in a second radio frame, where the first radio frame and the second radio frame are consecutive, and both the first radio frame and the second radio frame use a TDD uplink-downlink subframe configuration; sending, by the base station, an NPBCH to the UE by using a second subframe in the first radio frame and a second subframe in the second radio frame; sending, by the base station, an NSSS to the UE by using a third subframe in the first radio frame; and sending, by the base station, a SIB1-NB to the UE by using a third subframe in the second radio frame.

11 Claims, 16 Drawing Sheets

(51) Int. Cl.
*H04L 5/14* (2006.01)
*H04W 48/10* (2009.01)

(52) U.S. Cl.
CPC ........ *H04J 11/0079* (2013.01); *H04L 5/1469* (2013.01); *H04W 48/10* (2013.01); *H04J 2211/005* (2013.01)

(58) Field of Classification Search
CPC .............. H04J 11/0076; H04J 11/0079; H04J 2211/005; H04W 48/10; H04W 48/12; H04W 72/042; H04W 72/1289; H04W 4/70; H04W 72/0446; H04W 72/0493
See application file for complete search history.

(56) References Cited

U.S. PATENT DOCUMENTS

| | | | |
|---|---|---|---|
| 2017/0373900 A1* | 12/2017 | Adhikary et al. | ........................... H04W 56/0015 |
| 2018/0241495 A1 | 8/2018 | Xue et al. | |
| 2019/0246454 A1* | 8/2019 | Niu | .................. H04W 72/0446 |
| 2020/0077364 A1 | 3/2020 | Basu Mallick et al. | |

FOREIGN PATENT DOCUMENTS

| | | |
|---|---|---|
| WO | 2016130826 A1 | 8/2016 |
| WO | 2017014602 A1 | 1/2017 |
| WO | 2017052326 A1 | 3/2017 |
| WO | 2017069474 A1 | 4/2017 |
| WO | 2017105338 A1 | 6/2017 |
| WO | 2017122062 A1 | 7/2017 |

OTHER PUBLICATIONS

"Synchronization signal design for NB-IoT," 3GPP TSG RAN1 meeting #84, St Julian's Malta, R1-160449, XP051063775, pp. 1-7, 3rd Generation Partnership Project, Valbonne, France (Feb. 15-19, 2016).

"NB-IOT-downlink Physical Layer Concept Description," 3GPP TSG RAN WG1 Meeting # 83, Anaheim, USA, R1-156462 , pp. 1-11, 3rd Generation Partnership Project, Valbonne, France (Nov. 15-22, 2015).

"3rd Generation Partnership Project; Technical Specification Group Radio Access Network;Evolved Universal Terrestrial Radio Access (E-UTRA); Physical channels and modulation (Release 14)," 3GPP TS 36.211 V14.3.0, pp. 1-195, 3rd Generation Partnership Project, Valbonne, France (Jun. 2017).

"3rd Generation Partnership Project; Technical Specification Group Radio Access Network; Evolved Universal Terrestrial Radio Access (E-UTRA); Physical layer procedures (Release 14)," 3GPP TS 36.213 V14.3.0, pp. 1-460, 3rd Generation Partnership Project, Valbonne, France (Jun. 2017).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.3.0, pp. 1-745, 3rd Generation Partnership Project, Valbonne, France (Jun. 2017).

"New WID on Further NB-IoT enhancements," 3GPP TSG RAN Meeting #75, Dubrovnik, Croatia, RP-170852, pp. 1-6, 3rd Generation Partnership Project, Valbonne, France (Mar. 6-9, 2017).

IN/202047009542, Office Action, dated Aug. 16, 2021.

* cited by examiner

DATA TRANSMISSION METHOD, DEVICE, AND SYSTEM

CROSS-REFERENCE TO RELATED APPLICATIONS

This application is a continuation of International Application No. PCT/CN2018/079041, filed on Mar. 14, 2018, which claims priority to Chinese Patent Application No. 201710682622.0, filed on Aug. 10, 2017. The disclosures of the aforementioned applications are hereby incorporated by reference in their entireties.

TECHNICAL FIELD

Embodiments of the present invention relate to the field of communications technologies, and in particular, to a data transmission method, device, and system.

BACKGROUND

With development of communications technologies, machine type communication (MTC), also referred to as machine to machine (M2M) communication or internet of things (IoT) communication, for example, narrowband internet of things (NB-IoT) communication is more widely applied.

A current NB-IoT system supports only a half-duplex frequency division duplex (HD-FDD) technology, but a long term evolution (LTE) system supports a frequency division duplex (FDD) technology and a time division duplex (TDD) technology. In other words, the current NB-IoT system can be compatible with only the FDD technology in the LTE system, but cannot be compatible with the TDD technology in the LTE system.

Specifically, when the NB-IoT system uses the HD-FDD technology, all subframes in one radio frame may be downlink subframes. To be specific, there are sufficient subframes in the radio frame to broadcast a downlink signal. In addition, a fixed subframe in the radio frame is used to broadcast a fixed downlink signal. For example, a $1^{st}$ subframe in the radio frame is used to broadcast a narrowband primary synchronization signal (NPSS).

However, in the TDD technology, only some subframes in one radio frame are downlink subframes. Consequently, there may be insufficient downlink subframes in the radio frame to broadcast a downlink signal.

In this way, how to use the current HD-FDD technology to enable the NB-IoT system to be compatible with the TDD technology in the LTE system is a problem to be resolved.

SUMMARY

This application provides a data transmission method, device, and system, used in a data transmission process between a base station and UE in an NB-IoT system, which are specifically applied to a process in which the base station sends a downlink signal to the UE by using a TDD technology, to enable the NB-IoT system to be compatible with the TDD technology in an LTE system, and improve spectrum resource utilization in data transmission between the base station and the UE.

To achieve the foregoing objectives, the following technical solutions are used in this application:

According to a first aspect, this application provides a data transmission method, where the data transmission method includes: sending, by a base station, a narrowband primary synchronization signal NPSS to user equipment UE by using a first subframe in a first radio frame and a first subframe in a second radio frame, where the first radio frame and the second radio frame are consecutive, and both the first radio frame and the second radio frame use a TDD uplink-downlink subframe configuration; sending, by the base station, a narrowband physical broadcast channel NPBCH to the UE by using a second subframe in the first radio frame and a second subframe in the second radio frame; sending, by the base station, a narrowband secondary synchronization signal NSSS to the UE by using a third subframe in the first radio frame; and sending, by the base station, a system information block SIB1-NB to the UE by using a third subframe in the second radio frame.

According to the data transmission method provided in this application, in an NB-IoT system, because 10 subframes in a radio frame using an HD-FDD technology can all be used to send a downlink signal; while in a radio frame using a TDD technology, a downlink signal is sent by using some subframes (for example, a downlink subframe or a special subframe) in a radio frame using the TDD uplink-downlink subframe configuration. Therefore, the NB-IoT system is compatible with the TDD technology in the LTE system, thereby improving spectrum resource utilization in data transmission between the base station and the UE in the NB-IoT system. In addition, deployment flexibility in the NB-IoT system may be improved. To be specific, the NB-IoT system may be deployed in an LTE TDD system, or may be deployed in an LTE FDD system.

In addition, because delay performance of a downlink signal existing when the TDD technology is used is consistent with delay performance of a downlink signal existing when the HD-FDD technology is used, the base station or the UE that supports the HD-FDD technology can better support the TDD technology. This improves spectrum resource utilization in data transmission between the base station and the UE in the NB-IoT system. In addition, a plurality of TDD uplink-downlink subframe configurations in the LTE system may be applied to the NB-IoT system; and when the TDD technology is applied to the NB-IoT system, all subframes in one radio frame are used to transmit a downlink signal or an uplink signal. Therefore, in the NB-IoT system supporting the TDD technology, flexibility in selecting an uplink-downlink subframe configuration when the base station sends a downlink signal to the UE can be improved.

With reference to the first aspect, in a first possible implementation, in the first radio frame and the second radio frame, the first subframe, the second subframe, and the third subframe each are a downlink subframe.

It should be noted that, the NB-IoT system can support six TDD uplink-downlink subframe configurations: UL-DL(1), UL-DL(2), UL-DL(3), UL-DL(4), UL-DL(5), and UL-DL(6); while when the TDD technology is applied to the NB-IoT system, all subframes in one radio frame are used to transmit a downlink signal or an uplink signal. Therefore, in the NB-IoT system supporting the TDD technology, flexibility in selecting an uplink-downlink subframe configuration when the base station sends a downlink signal to the UE is relatively high. In addition, when the TDD uplink-downlink subframe configuration is used, because the first subframe, the second subframe, and the third subframe all are downlink subframes, a symbol 3 to a symbol 13 of each subframe in the first subframe, the second subframe, and the third subframe may be used to send a downlink signal. Therefore, a downlink signal existing when the TDD technology is used is of same construction as a downlink signal existing when the HD-FDD technology is used, that is, each is constructed in the symbol 3 to the symbol 13 in a subframe. In this way, complexity of constructing the NPSS, the NSSS, the NPBCH, and the SIB1-NB by the base station is reduced. In addition, after receiving the downlink signal sent by the base station, the UE is enabled to detect the downlink signal on the symbol 3 to the symbol 13 in the subframe regardless of whether a subframe in which the downlink signal is located uses the HD-FDD technology or the TDD technology. This can reduce complexity of detecting the NPSS, the NSSS, the NPBCH, and the SIB1-NB by the UE.

With reference to the first aspect, in a second possible implementation, in the first radio frame and the second radio frame, the first subframe and the third subframe each are a downlink subframe, the second subframe in the first radio frame includes two special subframes in the first radio frame, and the second subframe in the second radio frame includes two special subframes in the second radio frame; or the second subframe in the first radio frame includes a special subframe and a downlink subframe in the first radio frame, and the second subframe in the second radio frame includes a special subframe and a downlink subframe in the second radio frame.

According to the data transmission method provided in this application, the NB-IoT system applying the TDD technology can support seven TDD uplink-downlink subframe configurations: UL-DL(0), UL-DL(1), UL-DL(2), UL-DL(3), UL-DL(4), UL-DL(5), and UL-DL(6); while when the TDD technology is applied to the NB-IoT system, all subframes in one radio frame are used to transmit a downlink signal or an uplink signal. Therefore, the NB-IoT system can apply all TDD uplink-downlink subframe configurations in the LTE system. This makes flexibility in selecting an uplink-downlink subframe configuration when the base station sends a downlink signal to the UE to be relatively high. In addition, when the TDD uplink-downlink subframe configuration is used, because both the first subframe and the third subframe are downlink subframes, the symbol 3 to the symbol 13 of each subframe in the first subframe and the third subframe may be used to send a downlink signal. Therefore, some downlink signals existing when the TDD technology is used are of same construction as a downlink signal existing when the HD-FDD technology is used, that is, each is constructed in the symbol 3 to the symbol 13 in a subframe. In this way, complexity of constructing the NPSS, the NSSS, the NPBCH, and the SIB1-NB by the base station is reduced. In addition, after receiving the some downlink signals sent by the base station, the UE is enabled to detect the downlink signals on the symbol 3 to the symbol 13 in related subframes regardless of whether subframes in which the downlink signals are located use the HD-FDD technology or the TDD technology. This can reduce complexity of detecting the NPSS, the NSSS, the NPBCH, and the SIB1-NB by the UE.

With reference to the first possible implementation, in a third possible implementation, the first subframe is a subframe 0, the second subframe is a subframe 5, and the third subframe is a subframe 9; or the first subframe is the subframe 0, the second subframe is the subframe 9, and the third subframe is the subframe 5; or the first subframe is the subframe 5, the second subframe is the subframe 0, and the third subframe is the subframe 9; or the first subframe is the subframe 5, the second subframe is the subframe 9, and the third subframe is the subframe 0; or the first subframe is the subframe 9, the second subframe is the subframe 0, and the third subframe is the subframe 5; or the first subframe is the subframe 9, the second subframe is the subframe 5, and the third subframe is the subframe 0.

When a combination of the first subframe, the second subframe, and the third subframe are any combination of the subframe 0, the subframe 5, and the subframe 9, the NB-IoT system can support six TDD uplink-downlink subframe configurations: UL-DL (1), UL-DL (2), UL-DL (3), UL-DL (4), UL-DL (5), and UL-DL (6). This makes flexibility in selecting an uplink-downlink subframe configuration when the base station sends a downlink signal to the UE in the NB-IoT system to be relatively high.

With reference to the second possible implementation, in a fourth possible implementation, the first subframe is the subframe 0, the second subframe includes a subframe 1 and a subframe 6, and the third subframe is the subframe 5; or the first subframe is the subframe 5, the second subframe includes the subframe 1 and the subframe 6, and the third subframe is the subframe 0.

When the first subframe and the third subframe are any combination of the subframe 0 and the subframe 5, and the third subframe includes the subframe 1 and the subframe 6, the NB-IoT system can support seven TDD uplink-downlink subframe configurations: UL-DL (0), UL-DL (1), UL-DL (2), UL-DL (3), UL-DL (4), UL-DL (5), and UL-DL (6). In addition, the base station can use most of 11 special subframe configurations. This makes flexibility in selecting an uplink-downlink subframe configuration when the base station sends a downlink signal to the UE in the NB-IoT system to be relatively high.

With reference to the third possible implementation, in a fifth possible implementation, the subframe 0, the subframe 5, and the subframe 9 each include a symbol 0 to a symbol 13; the symbol 3 to the symbol 13 in the subframe 0 are used to send the NPSS, the NSSS, the NPBCH, or the SIB1-NB; the symbol 3 to the symbol 13 in the subframe 5 are used to send the NPSS, the NSSS, the NPBCH, or the SIB1-NB; and the symbol 3 to the symbol 13 in the subframe 9 are used to send the NPSS, the NSSS, the NPBCH, or the SIB1-NB.

In any one of the configurations, of the first subframe, the second subframe, and the third subframe, including the subframe 0, the subframe 5, and the subframe 9, a subframe in which the NPSS, the NSSS, the NPBCH, or the SIB1-NB is sent is determined. For example, when the first subframe is the subframe 0, the second subframe is the subframe 5, and the third subframe is the subframe 9, after the UE receives the downlink signal sent by the base station, regardless of whether a subframe in which the downlink signal is located uses the HD-FDD technology or the TDD technology, the UE can detect the NPSS on the symbol 3 to the symbol 13 in the subframe 0, detect the NPBCH on the symbol 3 to the symbol 13 in the subframe 5, and detect the NSSS and the SIB1-NB on the symbol 3 to the symbol 13 in the subframe 9. In this way, complexity of detecting the NPSS, the NPBCH, the NSSS, and the SIB1-NB by the UE is reduced, and stable operation of the UE is facilitated.

With reference to the fourth possible implementation, in a sixth possible implementation, the subframe 0, the subframe 1, the subframe 5, and the subframe 6 each include a symbol 0 to a symbol 13; the symbol 3 to the symbol 13 in the subframe 0 are used to send the NPSS, or the NSSS, or the SIB1-NB; b symbols in the symbol 2 to the symbol 11 in the subframe 1 and c symbols in the symbol 3 to the symbol 11 in the subframe 6 are used to send the NPBCH, where b is greater than or equal to 4 and less than or equal to 10, c is greater than or equal to 3 and less than or equal to 9, and b+c is greater than or equal to 7 and less than or equal to 11; and the symbol 3 to the symbol 13 in the subframe 5 are used to send the NPSS, or the NSSS, or the SIB1-NB.

Signal construction of the NPBCH may be different from signal construction of the NPBCH when the HD-FDD technology is used. The signal construction of the NPBCH may be in two subframes, for example, in the symbol 2 to the symbol 4 of one subframe and the symbol 3 to the symbol 7 of another subframe, that is, b is equal to 3, and c is equal to 5.

With reference to the first aspect, and the first to fifth possible implementations, in a seventh possible implementation, when the first subframe and the third subframe in the first radio frame are not a combination of the subframe 5 and the subframe 9, the first subframe and the third subframe in the first radio frame are separated by a subframes, where a is a natural number, a is not equal to 3 and is less than 9, and that the first subframe and the third subframe in the first radio frame are separated by a subframes is used to indicate that both the first radio frame and the second radio frame use the TDD uplink-downlink subframe configuration.

In the radio frame using the HD-FDD technology, the subframe 5 in which the NPSS is sent and the subframe 9 in which the NSSS is sent are separated by three subframes. Therefore, when it is designed that in the radio frame using the TDD uplink-downlink subframe configuration, a subframe in which the NPSS is sent and a subframe in which the NSSS is sent are separated by a subframes, that the first subframe and the third subframe in the first radio frame are separated by a subframes may be used to indicate that both the first radio frame and the second radio frame use the TDD uplink-downlink subframe configuration. In this way, the UE can be supported in determining that the first radio frame and the second radio frame use the TDD uplink-downlink subframe configuration.

With reference to the first aspect and the first to sixth possible implementations, in an eighth possible implementation, the NPSS includes first indication information, and the first indication information is used to indicate that both the first radio frame and the second radio frame use the TDD uplink-downlink subframe configuration; or a signal format of the NPSS is a first signal format, and the first signal format is used to indicate that both the first radio frame and the second radio frame use the TDD uplink-downlink subframe configuration.

When constructing the NPSS, the NSSS, the NPBCH, and the SIB1-NB, the base station may indicate, by using the first indication information in the NPSS or the signal format of the NPSS, that both the first radio frame and the second radio frame use the TDD uplink-downlink subframe configuration. Therefore, the UE can be supported in determining that the first radio frame and the second radio frame use the TDD uplink-downlink subframe configuration.

With reference to the first aspect and any one of the foregoing possible implementations, in a ninth possible implementation, the base station sends the NPSS to the UE by using the first subframe in the first radio frame and the first subframe in the second radio frame; sends the NPBCH to the UE by using the second subframe in the first radio frame and the second subframe in the second radio frame; and sends the NSSS to the UE by using the third subframe in the first radio frame. Before the base station sends the SIB1-NB to the UE by using the third subframe in the second radio frame, the method further includes: obtaining, by the base station, the NPSS, the NSSS, the NPBCH, and the SIB1-NB.

In a process of obtaining the NPSS, the NSSS, the NPBCH, and the SIB1-NB, the base station may construct the NPSS, the NSSS, the NPBCH, and the SIB1-NB, design signal formats of the NPSS, the NSSS, the NPBCH, and the SIB1-NB, and add some indication information to each downlink signal. For example, the base station may construct the NPSS, the NSSS, the NPBCH, and the SIB1-NB to be sent on a symbol 3 to a symbol 13 in a subframe, design the signal formats of the NPSS, the NSSS, the NPBCH, and the SIB1-NB as the first signal format, and add the first indication information to the NPSS. In this way, it can be indicated that the first radio frame and the second radio frame use the TDD uplink-downlink subframe configuration.

According to a second aspect, this application provides a data transmission method, where the data transmission method includes: receiving, by UE in a first subframe in a first radio frame and a first subframe in a second radio frame, an NPSS sent by a base station; receiving, by the UE in a second subframe in the first radio frame and a second subframe in the second radio frame, an NPBCH sent by the base station; receiving, by the UE in a third subframe in the first radio frame, an NSSS sent by the base station; receiving, by the UE in a third subframe in the second radio frame, a SIB1-NB sent by the base station; and if the first subframe and the third subframe in the first radio frame are separated by a subframes, or the NPSS includes first indication information, or a signal format of the NPSS is a first signal format, determining, by the UE, that both the first radio frame and the second radio frame use a TDD uplink-downlink subframe configuration, where a is a natural number, a is not equal to 3 and is less than 9, the first indication information is used to indicate that both the first radio frame and the second radio frame use the TDD uplink-downlink subframe configuration, and the first signal format is used to indicate that both the first radio frame and the second radio frame use the TDD uplink-downlink subframe configuration.

It should be noted that, according to the data transmission method provided in this application, it can be indicated that both the first radio frame and the second radio frame that are used when the base station sends a downlink signal to the UE use the TDD uplink-downlink subframe configuration. In this way, when receiving the NPSS, the NSSS, the NPBCH, and the SIB1-NB that are sent by the base station, the UE can determine that the TDD uplink-downlink subframe configuration is used for sending the NPSS, the NSSS, the NPBCH, and the SIB1-NB. This helps reduce complexity of detecting the NPSS, the NSSS, the NPBCH, and the SIB1-NB by the UE.

According to a third aspect, this application provides a base station, and the base station includes: a sending module. The sending module is configured to: send a narrowband primary synchronization signal NPSS to user equipment UE by using a first subframe in a first radio frame and a first subframe in a second radio frame, where the first radio frame and the second radio frame are consecutive, and both the first radio frame and the second radio frame use a TDD uplink-downlink subframe configuration; send a narrowband physical broadcast channel NPBCH to the UE by using a second subframe in the first radio frame and a second subframe in the second radio frame; send a narrowband secondary synchronization signal NSSS to the UE by using a third subframe in the first radio frame; and send a system information block SIB1-NB to the UE by using a third subframe in the second radio frame.

With reference to the third aspect, in a first possible implementation, in the first radio frame and the second radio frame, the first subframe, the second subframe, and the third subframe each are a downlink subframe.

With reference to the third aspect, in a second possible implementation, in the first radio frame and the second radio frame, the first subframe and the third subframe each are a downlink subframe, the second subframe in the first radio frame includes two special subframes in the first radio frame, and the second subframe in the second radio frame includes two special subframes in the second radio frame; or the second subframe in the first radio frame includes a special subframe and a downlink subframe in the first radio frame, and the second subframe in the second radio frame includes a special subframe and a downlink subframe in the second radio frame.

With reference to the first possible implementation, in a third possible implementation, the first subframe is a subframe 0, the second subframe is a subframe 5, and the third subframe is a subframe 9; or the first subframe is the subframe 0, the second subframe is the subframe 9, and the third subframe is the subframe 5; or the first subframe is the subframe 5, the second subframe is the subframe 0, and the third subframe is the subframe 9; or the first subframe is the subframe 5, the second subframe is the subframe 9, and the third subframe is the subframe 0; or the first subframe is the subframe 9, the second subframe is the subframe 0, and the third subframe is the subframe 5; or the first subframe is the subframe 9, the second subframe is the subframe 5, and the third subframe is the subframe 0.

With reference to the second possible implementation, in a fourth possible implementation, the first subframe is the subframe 0, the second subframe includes a subframe 1 and a subframe 6, and the third subframe is the subframe 5; or the first subframe is the subframe 5, the second subframe includes the subframe 1 and the subframe 6, and the third subframe is the subframe 0.

With reference to the third possible implementation, in a fifth possible implementation, the subframe 0, the subframe 5, and the subframe 9 each include a symbol 0 to a symbol 13; the symbol 3 to the symbol 13 in the subframe 0 are used to send the NPSS, the NSSS, the NPBCH, or the SIB1-NB; the symbol 3 to the symbol 13 in the subframe 5 are used to send the NPSS, the NSSS, the NPBCH, or the SIB1-NB; and the symbol 3 to the symbol 13 in the subframe 9 are used to send the NPSS, the NSSS, the NPBCH, or the SIB1-NB.

With reference to the fourth possible implementation, in a sixth possible implementation, the subframe 0, the subframe 1, the subframe 5, and the subframe 6 each include a symbol 0 to a symbol 13; the symbol 3 to the symbol 13 in the subframe 0 are used to send the NPSS, or the NSSS, or the SIB1-NB; b symbols in the symbol 2 to the symbol 11 in the subframe 1 and c symbols in the symbol 3 to the symbol 11 in the subframe 6 are used to send the NPBCH, where b is greater than or equal to 4 and less than or equal to 10, c is greater than or equal to 3 and less than or equal to 9, and b+c is greater than or equal to 7 and less than or equal to 11; and the symbol 3 to the symbol 13 in the subframe 5 are used to send the NPSS, or the NSSS, or the SIB1-NB.

With reference to the third aspect, and the first to fifth possible implementations, in a seventh possible implementation, when the first subframe and the third subframe in the first radio frame are not a combination of the subframe 5 and the subframe 9, the first subframe and the third subframe in the first radio frame are separated by a subframes, where a is a natural number, a is not equal to 3 and is less than 9, and that the first subframe and the third subframe in the first radio frame are separated by a subframes is used to indicate that both the first radio frame and the second radio frame use the TDD uplink-downlink subframe configuration.

With reference to the third aspect and the first to sixth possible implementations, in an eighth possible implementation, the NPSS includes first indication information, and the first indication information is used to indicate that both the first radio frame and the second radio frame use the TDD uplink-downlink subframe configuration; or a signal format of the NPSS is a first signal format, and the first signal format is used to indicate that both the first radio frame and the second radio frame use the TDD uplink-downlink subframe configuration.

With reference to the third aspect and any one of the foregoing possible implementations, in a ninth possible implementation, the base station may further include an obtaining module. The obtaining module is configured to: send the NPSS to the UE by using the first subframe in the first radio frame and the first subframe in the second radio frame; send the NPBCH to the UE by using the second subframe in the first radio frame and the second subframe in the second radio frame; send the NSSS to the UE by using the third subframe in the first radio frame; and before the obtaining module sends the SIB1-NB to the UE by using the third subframe in the second radio frame, obtain the NPSS, the NSSS, the NPBCH, and the SIB1-NB.

According to a fourth aspect, this application provides UE, and the UE includes: a receiving module and a determining module. The receiving module is configured to: receive, in a first subframe in a first radio frame and a first subframe in a second radio frame, an NPSS sent by a base station; receive, in a second subframe in the first radio frame and a second subframe in the second radio frame, an NPBCH sent by the base station; receive, in a third subframe in the first radio frame, an NSSS sent by the base station; and receive, in a third subframe in the second radio frame, a SIB1-NB sent by the base station. The determining module is configured to: if the first subframe and the third subframe in the first radio frame are separated by a subframes, or the NPSS includes first indication information, or a signal format of the NPSS is a first signal format, determine that both the first radio frame and the second radio frame use a TDD uplink-downlink subframe configuration, where a is a natural number, a is not equal to 3 and is less than 9, the first indication information is used to indicate that both the first radio frame and the second radio frame use the TDD uplink-downlink subframe configuration, and the first signal format is used to indicate that both the first radio frame and the second radio frame use the TDD uplink-downlink subframe configuration.

According to a fifth aspect, this application provides a base station, and the base station includes: one or more processors, a memory, a communications interface, and a bus, where the memory is configured to store at least one instruction, the one or more processors, the memory, and the communications interface are connected by using a bus, and when the base station runs, the one or more processors execute the at least one instruction stored in the memory, so that the base station performs the data transmission method according to the first aspect and the possible implementations of the first aspect.

According to a sixth aspect, this application provides a computer storage medium, where the computer storage medium includes at least one instruction. When the at least one instruction is run on a computer, the computer is enabled to perform the data transmission method according to the first aspect and the possible implementations of the first aspect.

According to a seventh aspect, this application provides a computer program product, where the computer program product includes at least one instruction.

When the at least one instruction is run on a computer, the computer is enabled to perform the data transmission method according to the first aspect and the possible implementations of the first aspect.

According to an eighth aspect, this application provides UE. The UE includes: one or more processors, a memory, a communications interface, and a bus. The memory is configured to store at least one instruction, the one or more processors, the memory, and the communications interface are connected by using the bus, and when the UE runs, the one or more processors execute the at least one instruction stored in the memory, so that the UE performs the data transmission method according to the second aspect.

According to a ninth aspect, this application provides a computer storage medium, where the computer storage medium includes at least one instruction. When the at least one instruction is run on a computer, the computer is enabled to perform the data transmission method according to the second aspect.

According to a tenth aspect, this application provides a computer program product, where the computer program product includes at least one instruction. When the at least one instruction is run on a computer, the computer is enabled to perform the data transmission method according to the second aspect.

According to an eleventh aspect, this application provides a data transmission system, and the data transmission system includes: the base station according to the fifth aspect and the at least one UE according to the eighth aspect.

DESCRIPTION OF EMBODIMENTS

Embodiments of the present invention provide a data transmission method, device, and system, which are used in a data transmission process between a base station and UE in an NB-IoT system, and are specifically applied to a process in which the base station sends a downlink signal to the UE by using a TDD technology, to enable the NB-IoT system to be compatible with the TDD technology in an LTE system, and improve spectrum resource utilization in data transmission between the base station and the UE.

The NB-IoT system to which the data transmission method provided in the embodiments of the present invention is applied may include at least one base station and at least one UE. One base station covers one or more cells, and one cell serves one or more UEs. Specifically, one base station may provide a service for a large quantity of deployed UEs. It should be noted that the data transmission system provided in the embodiments of the present invention may be the foregoing NB-IoT system.

The base station not only supports an HD-FDD technology, but also supports the TDD technology. For example, the base station may be a base station (BS), eNodeB (eNB), a gNB, an internet of things base station (Internet of Thing eNB, IoT eNB), an MTC base station, or the like. This is not specifically limited in the embodiments of the present invention.

The UE may be UE that supports communications types such as NB-IoT, long term evolution (LTE), and NR (New Radio Access Technology in 3GPP). The UE not only supports the HD-FDD technology, but also supports the TDD technology. In addition, power consumption of the UE is relatively low. For example, the UE may be a smart water/electricity meter, a monitor, a cellular phone, a personal digital assistant (PDA), a wireless device, a wireless modem, a wireless router, a laptop computer, a telemetry device, a tracking device, or the like. It should be noted that, in the embodiments of the present invention, the foregoing UE is sometimes referred to as internet of things UE, but a different name of the UE is merely used to describe the UE, and imposes no limitation on the UE.

The following describes in detail the technical solutions in the embodiments of the present invention with reference to the accompanying drawings in the embodiments of the present invention.

Figure 1:
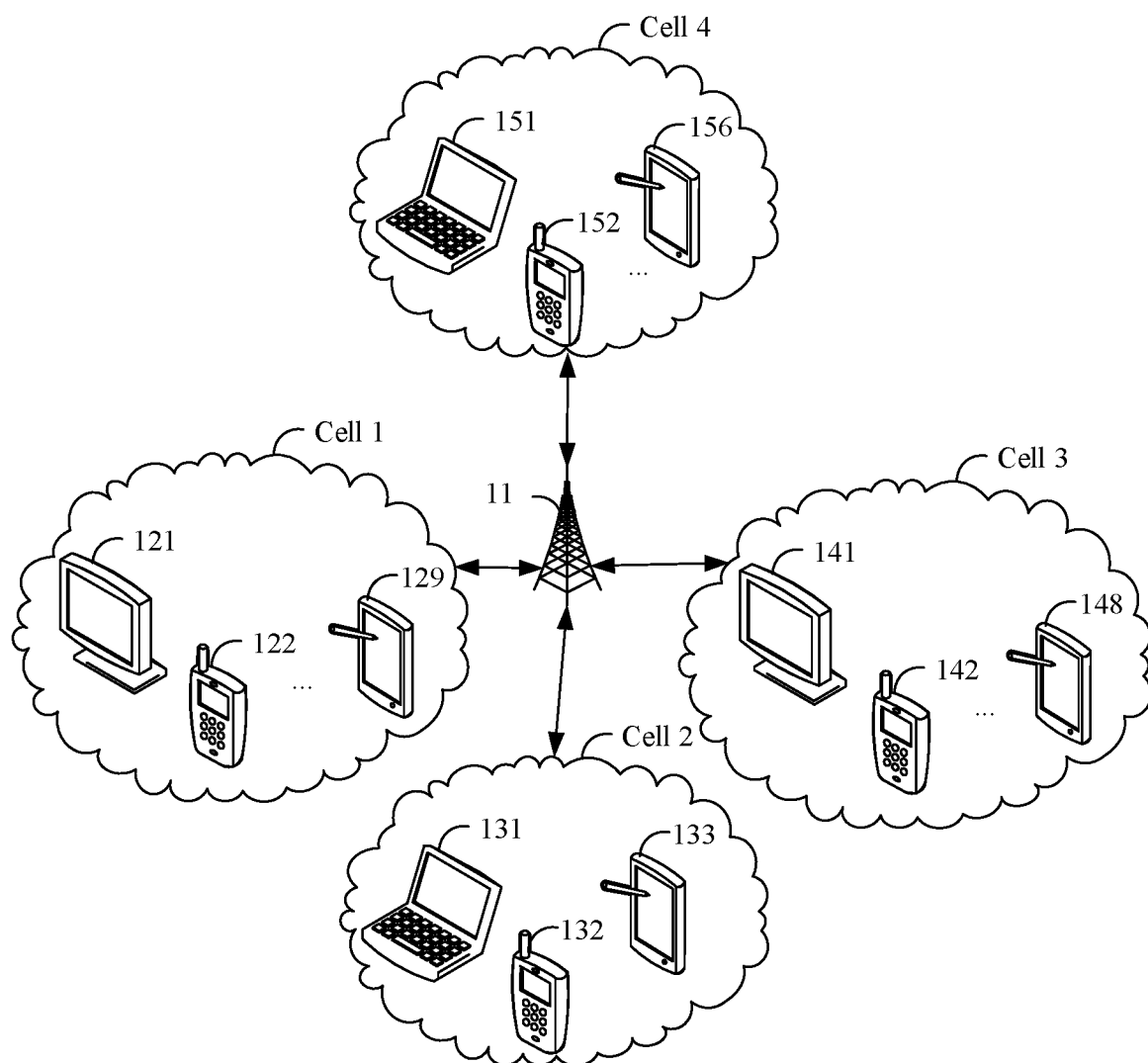
FIG. 1 shows a system architecture to which a data transmission method according to an embodiment of the present invention is applied.

For example, FIG. 1 shows a system architecture to which the data transmission method according to the embodiments of the present invention is applied. In FIG. 1, the system includes a base station 11. Cells served by the base station 11 include a cell 1, a cell 2, a cell 3, and a cell 4. UEs served by the cell 1 include UE 121 to 129, UEs served by the cell 2 include UE 131 to 133, UEs served by the cell 3 include UE 141 to 148, and UEs served by the cell 4 include UE 151 to 156.

The base station 11 may send a downlink signal, for example, a unicast downlink signal or a broadcast downlink signal, to any one of the foregoing cells. UE in any one of the foregoing cells may receive the downlink signal sent by the base station 11, or the UE may send, to the base station, an uplink signal, for example, a signal in response to the downlink signal sent by the base station 11. For example, the base station 11 may send four downlink signals: an NPSS, a narrowband secondary synchronization signal (NSSS), a narrowband physical broadcast channel (NPBCH), and a system information block Type1-NB (SIB1-NB) to the cell 1 served by the base station 11. Certainly, the downlink signal sent by the base station to the UE may further include another downlink signal, for example, a SIB2-NB.

Specifically, the base station 11 may transmit data to the UE in each cell served by the base station 11 by using a plurality of radio frames, and the plurality of radio frames may use the HD-FDD technology or the TDD technology. When the HD-FDD technology is used, subframes in one radio frame may all be downlink subframes or uplink subframes. When the TDD technology is used, one radio frame includes a downlink subframe, an uplink subframe, and a special subframe. For example, in an existing technology, the base station 11 may send the NPSS, the NSSS, the NPBCH, and the SIB1-NB to the UE 121 in the cell 1 by using at least one radio frame using the HD-FDD technology.

The NPSS may be used to determine a time interval between one NPSS and an adjacent NPSS. For example, the time interval between one NPSS and an adjacent NPSS is 10 milliseconds (ms). Therefore, the NPSS may be used to determine a boundary of a radio frame, to divide different radio frames. The NSSS carries a physical layer cell identifier (cell ID), for example, an identifier of the cell 1 shown in FIG. 1. The NPBCH may carry a system frame number (SFN), namely, a number of each radio frame. The SIB1-NB may carry some system messages, for example, a system message change tag (system Information Value Tag).

It should be noted that one radio frame includes 10 subframes. When both the base station and the UE support the HD-FDD technology, the radio frame uses the HD-FDD technology, and 10 subframes in the one radio frame all are downlink subframes used to send a downlink signal. For example, although the base station 11 and the UE 121 do not need to receive or send a signal at the same time, the base station 11 and the UE 121 need to receive or send a signal at different frequency bands. In addition, the 10 subframes using the HD-FDD technology in the radio frame may all be downlink subframes used to send a downlink signal, or may all be uplink subframes used to send an uplink signal.

Figure 2:
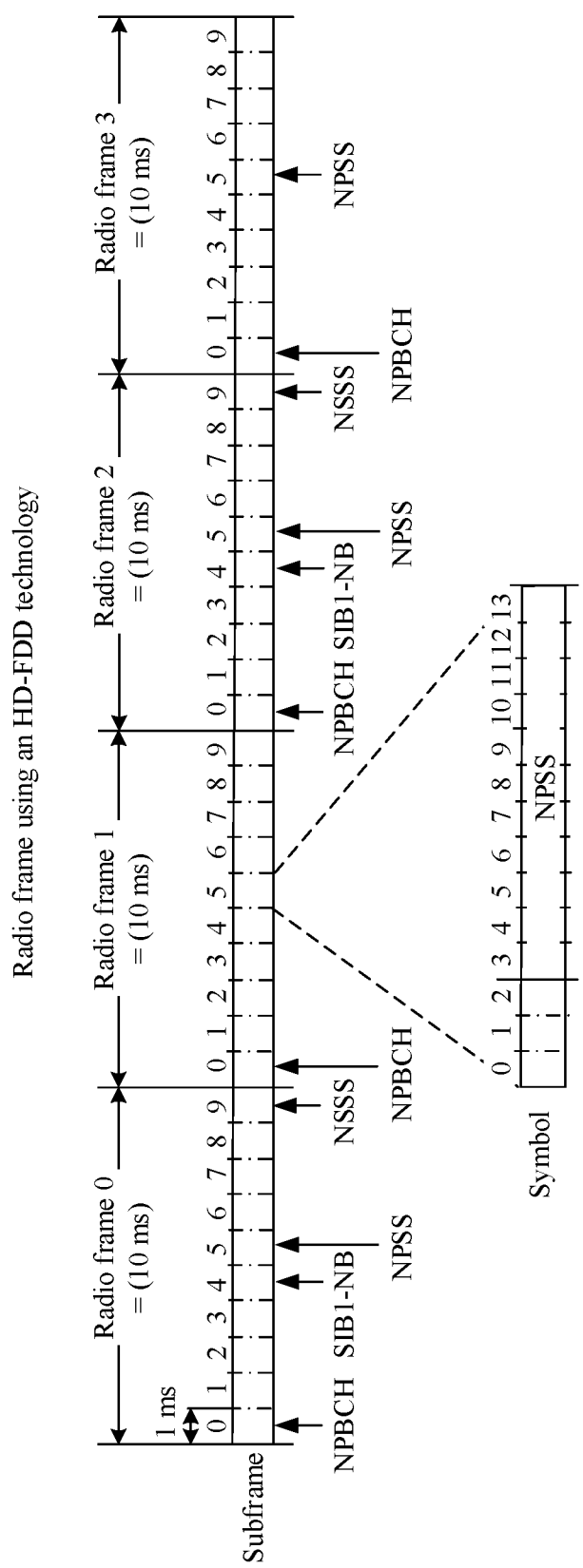
FIG. 2 is a schematic structural diagram 1 of a radio frame according to an embodiment of the present invention.

For example, FIG. 2 is a schematic structural diagram of a radio frame according to an embodiment of the present invention, and the radio frame uses the HD-FDD technology. FIG. 2 shows four consecutive radio frames: a radio frame 0, a radio frame 1, a radio frame 2, and a radio frame 3. Duration of each radio frame is 10 milliseconds (ms). Each radio frame includes 10 subframes: a subframe 0 to a subframe 9 (also denoted as #0 to #9), and duration of each subframe is 1 ms. Each subframe includes 14 symbols: a symbol 0 to a symbol 13. For example, a subframe 5 of the radio frame 1 shown in FIG. 2 includes the symbol 0 to the symbol 13. The symbol 3 to the symbol 13 in each subframe may be used to carry an uplink signal or a downlink signal. A symbol provided in this application is an OFDM symbol.

In the existing HD-FDD technology, the base station 11 sends the NPSS, the NSSS, the NPBCH, and the SIB1-NB by using a fixed subframe (a fixed symbol in the fixed subframe) in at least one radio frame. In other words, signal construction of the NPSS, the NSSS, the NPBCH, and the SIB1-NB is determined. For example, the NPSS, the NSSS, the NPBCH, and the SIB1-NB are all sent on the symbol 3 to the symbol 13 of one subframe.

As shown in FIG. 2, in the HD-FDD technology, the NPBCH is sent in a subframe 0 with a sending period of 10 ms. The SIB1-NB is sent in a subframe 4 with a sending period of 20 ms. The NPSS is sent in a subframe 5 with a sending period of 10 ms. The NSSS is sent in a subframe 9 with a sending period of 10 ms. The NPSS occupies 11 subcarriers in frequency domain, and each subcarrier is 15 kHz. The NSSS, the NPBCH, and the SIB1-NB each occupy 12 subcarriers in frequency domain. In addition, the symbol 3 to the symbol 13 in each subframe are used to send a downlink signal. For example, the symbol 3 to the symbol 13 in a subframe 0 is used to send the NPBCH. It can be learned that, the subframe 5 and the subframe 9 in a radio frame are separated by three subframes, that is, a subframe in which the NPSS is sent and a subframe in which the NSSS is sent are separated by three subframes.

When the base station 11 sends the NPSS, the NSSS, the NPBCH, and the SIB1-NB to the UE 121 in the cell 1, the UE 121 may receive the NPSS, the NSSS, the NPBCH, and the SIB1-NB, for example, a plurality ofNPSSs, a plurality ofNSSSs, a plurality ofNPBCHs, and a plurality of SIB1-NBs that are sent in a plurality of radio frames. In addition, the UE 121 can determine a boundary of each radio frame through blind detection of the NPSS in the subframe 5 in each radio frame. Subsequently, the UE 121 may sequentially detect the NSSS, the NPBCH, and the SIB1-NB in a corresponding position in each radio frame, for example, detect the NSSS in the subframe 9 in the radio frame.

When the NB-IoT system supports the TDD technology, a TDD uplink-downlink subframe configuration may be used for a radio frame in which the base station transmits data with the UE in the NB-IoT system. In the data transmission method provided in the embodiments of the present invention, the TDD uplink-downlink subframe configuration used in a radio frame applied in the NB-IoT system is a TDD uplink-downlink subframe configuration in the LTE system. Table 1 is a TDD uplink-downlink subframe configuration table provided in the embodiments of the present invention.

TABLE 1

| TDD uplink-downlink subframe configuration table | | | | | | | | | | | |
|---|---|---|---|---|---|---|---|---|---|---|---|
| UL-DL Configuration | Switch-point periodicity | Subframe number | | | | | | | | | |
| | | 0 | 1 | 2 | 3 | 4 | 5 | 6 | 7 | 8 | 9 |
| UL-DL(0) | 5 ms | D | S | U | U | U | D | S | U | U | U |
| UL-DL(1) | 5 ms | D | S | U | U | D | D | S | U | U | D |
| UL-DL(2) | 5 ms | D | S | U | D | D | D | S | U | D | D |
| UL-DL(3) | 10 ms | D | S | U | U | U | D | D | D | D | D |
| UL-DL(4) | 10 ms | D | S | U | U | D | D | D | D | D | D |
| UL-DL(5) | 10 ms | D | S | U | D | D | D | D | D | D | D |
| UL-DL(6) | 5 ms | D | S | U | U | U | D | S | U | U | D |

A radio frame using the TDD uplink-downlink subframe configuration also includes 10 subframes: a subframe 0 to a subframe 9, 0 to 9 are subframe numbers, and each subframe includes a symbol 0 to a symbol 13. Specifically, as shown in Table 1, the TDD uplink-downlink subframe configuration may include seven uplink-downlink configurations (UL-DL Configuration). In the seven UL-DL configurations shown in Table 1, an uplink-downlink subframe switch-point periodicity of each of UL-DL (0), UL-DL (1), UL-DL (2), and UL-DL (6) are 5 ms, and an uplink-downlink subframe switch-point periodicity of each of UL-DL (3), UL-DL (4), and UL-DL (5) are 10 ms. In Table 1, "U" is used to represent a subframe for transmitting an uplink signal, namely, an uplink subframe; "D" is used to represent a subframe for transmitting a downlink signal (for example, NPSS), namely, a downlink subframe; and "S" is used to provide a guard period or a subframe that provides data transmission, namely, a special subframe. For example, a special subframe indicated by "S" may be used to transmit a downlink signal.

It can be learned from the seven uplink-downlink subframe configurations shown in Table 1 that a downlink signal may be transmitted in some subframes in one radio frame, for example, transmitted in a downlink subframe "D" or a special subframe "S", and another subframe (namely, an uplink subframe "S") does not transmit a downlink signal. For example, in UL-DL (1), a subframe 0, a subframe 4, a subframe 5, a subframe 9, a subframe 1, and a subframe 6 may be used to transmit a downlink signal, while a subframe 2, a subframe 3, a subframe 7, and a subframe 8 do not transmit a downlink signal. In addition, 10 subframes in one radio frame may be used to transmit data in a time division manner on a same frequency band. For example, a downlink subframe "D" and a special subframe "S" in one radio frame may be used to send a downlink signal in a time division manner on a same frequency band.

It should be noted that, according to the data transmission method provided in the embodiments of the present invention, in the NB-IoT system, the base station may send a downlink signal to the UE by using a radio frame using the TDD uplink-downlink subframe configuration.

Figure 3:
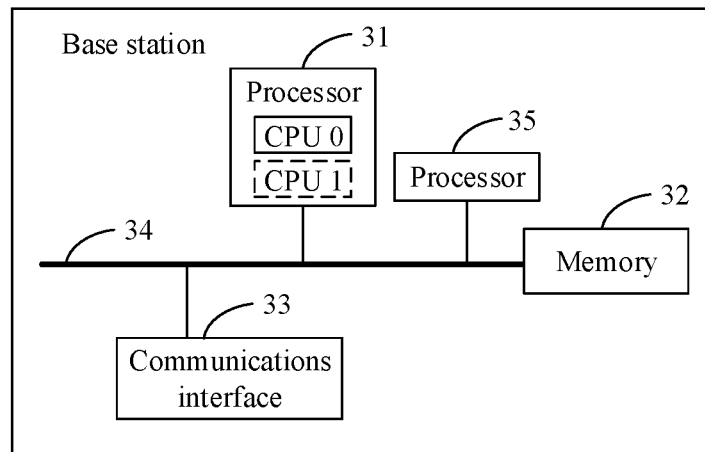
FIG. 3 is a schematic structural diagram 1 of a base station according to an embodiment of the present invention.

The following describes constituent parts of a base station in detail with reference to FIG. 3.

A processor 31 is a control center of the device, and may be one processor or may be a collective name of a plurality of processing elements. For example, the processor 31 may be a CPU, or may be an ASIC, or may be one or more integrated circuits configured to implement the embodiments of the present invention, for example, one or more DSPs or one or more FPGAs.

The processor 31 may run or execute a software program stored in a memory 32, and invoke data stored in the memory 32, to perform various functions of the device. For example, the processor 31 may be configured to distinguish a cell covered by the base station and UE covered by the cell, and generate a downlink signal such as an NPSS.

In specific implementation, in an embodiment, the processor 31 may include one or more CPUs, for example, a CPU 0 and a CPU 1 that are shown in FIG. 3.

In specific implementation, in an embodiment, the base station may include a plurality of processors such as the processor 31 and a processor 35 shown in FIG. 3. Each of these processors may be a single-core processor, or may be a multi-core processor. The processor herein may be one or more devices, circuits, and/or processing cores configured to process data (for example, a computer program instruction).

The memory 32 may be a ROM, another type of static storage device that can store static information and an instruction, a RAM, or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 32 is not limited thereto. The memory 32 may exist independently, and is connected to the processor 31 by using a communications bus 34. Alternatively, the memory 32 may be integrated with the processor 31.

The memory 32 is configured to store a software program for executing the solutions in the embodiments of the present invention, and execution of the software program is controlled by the processor 31. For example, the memory 32 stores a communications protocol between the base station and the UE, and the communications protocol uses the TDD technology.

A communications interface 33 may include two communications interfaces: a sending interface configured to send data to an external device and a receiving interface configured to receive data from an external device. In other words, the base station may receive and send data through two different communications interfaces respectively. For example, with reference to FIG. 1, the base station 11 may send a downlink signal to the UE 121 shown in FIG. 1 through one communications interface by using a radio frame using the TDD uplink-downlink subframe configuration, and may receive, through the other communications interface, an uplink signal, for example, a response message, sent by the UE 121 by using a radio frame using the TDD uplink-downlink subframe configuration. Certainly, the communications interface 33 may integrate a data receiving function and a data sending function into one communications interface, and the communications interface has the data receiving function and the data sending function. In addition, the communications interface 33 supports the TDD technology.

The structure of the base station shown in FIG. 3 does not constitute a limitation on the base station, and may include more or fewer components than those shown in the figure, or combine some components, or have different component arrangements.

Figure 4:
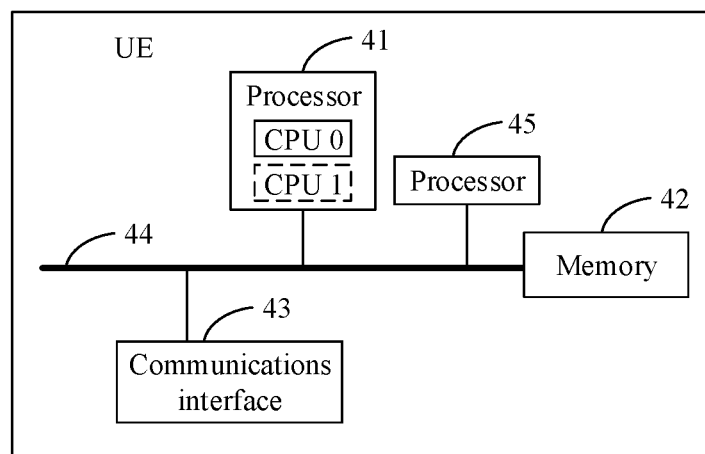
FIG. 4 is a schematic structural diagram 1 of UE according to an embodiment of the present invention.

For example, FIG. 4 is a schematic structural diagram of UE according to the embodiments of the present invention. As shown in FIG. 4, the UE may include at least one processor 41, a memory 42, and a communications interface 43.

The following describes constituent parts of the UE in detail with reference to FIG. 4.

The processor 41 is a control center of the device, and may be one processor or may be a collective name of a plurality of processing elements. For example, the processor 41 may be a CPU, or may be an ASIC, or may be one or more integrated circuits configured to implement the embodiments of the present invention, for example, one or more DSPs or one or more FPGAs.

The processor 41 may run or execute a software program stored in the memory 42, and invoke data stored in the memory 42, to perform various functions of the device. For example, the processor 41 may be configured to determine whether to connect to a base station. In specific implementation, in an embodiment, the processor 41 may include one or more CPUs, for example, a CPU 0 and a CPU 1 that are shown in FIG. 4.

In specific implementation, in an embodiment, the UE may include a plurality of processors such as the processor 41 and a processor 44 shown in FIG. 4. Each of these processors may be a single-core processor, or may be a multi-core processor. The processor herein may be one or more devices, circuits, and/or processing cores configured to process data (for example, a computer program instruction).

The memory 42 may be a ROM or another type of static storage device that can store static information and an instruction, or a RAM or another type of dynamic storage device that can store information and an instruction, or may be an EEPROM, a CD-ROM or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 42 is not limited thereto. The memory 42 may exist independently, and is connected to the processor 41 by using a communications bus 44. Alternatively, the memory 42 may be integrated into the processor 41.

The memory 42 is configured to store a software program for executing the solutions in the embodiments of the present invention, and execution of the software program is controlled by the processor 41. For example, the memory 42 stores a communications protocol between the UE and the base station, and the communications protocol uses the TDD technology.

The communications interface 43 may include two communications interfaces: a sending interface configured to send data to an external device and a receiving interface configured to receive data from an external device. In other words, the UE may receive and send data through two different communications interfaces respectively. For example, with reference to FIG. 1, the UE 121 may receive, through one communications interface, a downlink signal sent by the base station 11 by using a radio frame using the TDD uplink-downlink subframe configuration, and may send an uplink signal, for example, a response message, to the base station 11 through the other communications interface by using a radio frame using the TDD uplink-downlink subframe configuration. Certainly, the communications interface 43 may integrate a data receiving function and a data sending function into one communications interface, and the communications interface has the data receiving function and the data sending function. In addition, the communications interface 43 supports the TDD technology.

The structure of the UE shown in FIG. 4 does not constitute a limitation on the UE, and may include more or fewer components than those shown in the figure, or combine some components, or have different component arrangements.

It should be noted that in the embodiments of the present invention, an example in which the base station sends four downlink signals: the NPSS, the NSSS, the NPBCH, and the SIB1-NB to the UE is merely used below for describing the data transmission method provided in the embodiments of the present invention. In a process of sending a downlink signal by using a radio frame using a TDD uplink-downlink subframe configuration, the base station may send the NPSS, the NSSS, the NPBCH, and the SIB1-NB by using one or more subframes in each radio frame. In addition, data transmission between the base station and the UE described below in the embodiments of the present invention mainly means that the base station sends a downlink signal to the UE.

Figure 5:
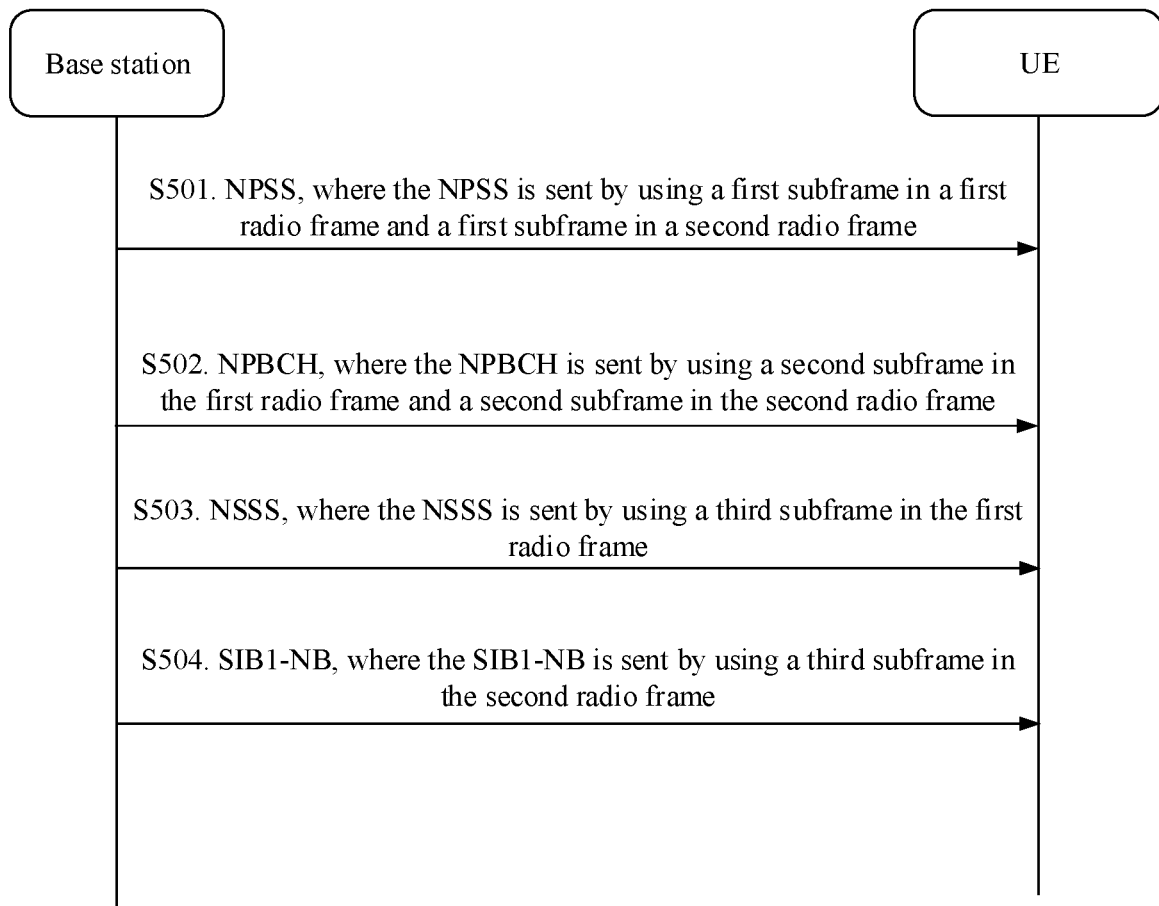
FIG. 5 is a schematic flowchart 1 of a data transmission method according to an embodiment of the present invention.

To make the objectives, technical solutions, and advantages of the embodiments of the present invention clearer, the following describes, in detail with reference to the NB-IoT system shown in FIG. 1, the base station shown in FIG. 3, and the UE shown in FIG. 4, a flowchart of a data transmission method shown in FIG. 5. Referring to FIG. 5, in an embodiment, the data transmission method provided in this application includes step 501 to step 504:

S501. The base station sends an NPSS to the UE by using a first subframe in a first radio frame and a first subframe in a second radio frame.

S502. The base station sends an NPBCH to the UE by using a second subframe in the first radio frame and a second subframe in the second radio frame.

S503. The base station sends an NSSS to the UE by using a third subframe in the first radio frame.

S504. The base station sends a SIB1-NB to the UE by using a third subframe in the second radio frame.

For example, with reference to FIG. 1 and FIG. 3, the foregoing steps 501 to 504 may be performed by the communications interface 33 of the base station 11 shown in FIG. 1.

Within a period of time (for example, two minutes), the base station may send a downlink signal to the UE by using a plurality of consecutive radio frames, and any two of the plurality of consecutive radio frames may be the first radio frame and the second radio frame. In other words, the first radio frame and the second radio frame are consecutive.

Both the first radio frame and the second radio frame use a TDD uplink-downlink subframe configuration. In other words, the first subframe, the second subframe, and the third subframe each are a subframe using the TDD uplink-downlink subframe configuration. Specifically, the first subframe, the second subframe, and the third subframe each may be implemented by a subframe that can support transmission of a downlink signal and that uses the TDD uplink-downlink subframe configuration, that is, implemented by a downlink subframe or a special subframe. In addition, the first subframe, the second subframe, and the third subframe are implemented by different subframes.

When the base station sends the NPSS, the NSSS, the NPBCH, and the SIB1-NB to the UE by using the first radio frame and the second radio frame, subframe numbers of the first subframe, the second subframe, and the third subframe in each of the first radio frame and the second radio frame are determined. For example, the first subframe is a subframe 0, the second subframe is a subframe 5, and the third subframe is a subframe 9. In addition, the NB-IoT system may use a plurality of TDD uplink-downlink subframe configurations, for example, a plurality of uplink-downlink subframe configurations in an LTE system such as UL-DL (0), UL-DL (1), and UL-DL (2) shown in Table 1. This is not limited in this embodiment of the present invention.

In addition, when the TDD uplink-downlink subframe configuration is used, a first subframe in each radio frame is used to send the NPSS, that is, a period of sending the NPSS is 10 ms. A second subframe in each radio frame is used to send the NPBCH, that is, a period of sending the NPBCH is 10 ms. Third subframes in two consecutive radio frames are used to alternately send the NSSS and the SIB1-NB, that is, a period of sending the NSSS and the SIB1-NB is 20 ms. To be specific, delay performance (periodicity) of a downlink signal existing when a TDD technology is used is consistent with delay performance of a downlink signal existing when an HD-FDD technology is used. In addition, the NPSS may occupy 11 subcarriers in frequency domain, and the NSSS, the NPBCH, and the SIB1-NB each may occupy 12 subcarriers in frequency domain.

It can be figured out that, before sending the NPSS, the NSSS, the NPBCH, and the SIB1-NB to the UE, the base station (for example, a memory of the base station) may store the NPSS, the NSSS, the NPBCH, and the SIB1-NB, or the base station may construct the NPSS, the NSSS, the NPBCH, and the SIB1-NB. Therefore, the data transmission method provided in the foregoing embodiment may further include step 501' before step 501.

S501'. The base station obtains the NPSS, the NSSS, the NPBCH, and the SIB1-NB.

For example, with reference to FIG. 1 and FIG. 3, the foregoing step 501' may be performed by the processor 31 of the base station 11 shown in FIG. 1.

When the base station sends a downlink signal to the UE in a broadcast manner, the NPSS, the NSSS, the NPBCH, and the SIB1-NB that are obtained by the base station correspond to a cell in which the UE is located. When the base station sends a downlink signal to the UE in a unicast manner, the NPSS, the NSSS, the NPBCH, and the SIB1-NB that are obtained by the base station correspond to the UE.

It should be noted that, in the data transmission method provided in this embodiment of the present invention, the base station in the NB-IoT system may send the downlink signal, for example, the NPSS, the NSSS, the NPBCH, and the SIB1-NB, to the UE by using the radio frame using the TDD uplink-downlink subframe configuration. To be specific, in the data transmission method provided in this embodiment of the present invention, the NB-IoT system can be compatible with the TDD technology in the LTE system.

In the NB-IoT system, 10 subframes in a radio frame using the HD-FDD technology can all be used to send the downlink signal; and some subframes (for example, downlink subframes or special subframes) in a radio frame using the TDD technology, namely, the radio frame using the TDD uplink-downlink subframe configuration are used to send the downlink signal. Therefore, the NB-IoT system is compatible with the TDD technology in the LTE system, so that spectrum resource utilization in data transmission between the base station and the UE in the NB-IoT system can be improved. In addition, deployment flexibility of the NB-IoT system can be improved. To be specific, the NB-IoT system may be deployed in an LTE TDD system, or may be deployed in an LTE FDD system.

In addition, because the delay performance of the downlink signal existing when the TDD technology is used is consistent with the delay performance of the downlink signal existing when the HD-FDD technology is used, a base station or UE that supports the HD-FDD technology can better support the TDD technology, to help improve spectrum resource utilization in data transmission between the base station and the UE in the NB-IoT system.

In addition, one or more TDD uplink-downlink subframe configurations in the LTE system may be applied to the NB-IoT system; and when the TDD technology is applied to the NB-IoT system, all subframes in one radio frame are used to transmit a downlink signal or an uplink signal. Therefore, the NB-IoT system supporting the TDD technology, flexibility in selecting an uplink-downlink subframe configuration when the base station sends the downlink signal to the UE can be improved.

According to a data transmission method provided in another embodiment of this application, in a process in which a base station sends an NPSS, an NSSS, an NPBCH, and a SIB1-NB to UE by using a radio frame using a TDD uplink-downlink subframe configuration, it may indicate whether the radio frame uses a TDD technology or an HD-FDD technology, in other words, whether the base station uses the TDD technology or the HD-FDD technology.

In a possible implementation, in a radio frame using the HD-FDD technology, a subframe 5 in which the NPSS is sent and a subframe 9 in which the NSSS is sent are separated by three subframes. Therefore, in the radio frame using the TDD uplink-downlink subframe configuration, a subframe in which the NPSS is sent and a subframe in which the NSSS is sent may be separated by a subframes, where a is a natural number, and a is not equal to 3 and less than 9. In this case, that a first subframe and a third subframe in a first radio frame are separated by a subframes is used to indicate that both the first radio frame and a second radio frame use the TDD uplink-downlink subframe configuration. It can be learned that, in the radio frame using the TDD uplink-downlink subframe configuration, a subframe in which the NPSS is sent and a subframe in which the NSSS is sent are not a combination of the subframe 5 and the subframe 9, that is, the first subframe and the third subframe in the first radio frame are not a combination of the subframe 5 and the subframe 9. For example, when the first subframe is the subframe 5, the third subframe is not the subframe 9; or when the first subframe is the subframe 9, the third subframe is not the subframe 5. In this way, the UE can be supported in determining that the first radio frame and the second radio frame use the TDD uplink-downlink subframe configuration.

In another possible implementation, the NPSS may include first indication information, and the first indication information is used to indicate that both the first radio frame and the second radio frame use the TDD uplink-downlink subframe configuration. Alternatively, a signal format of the NPSS is a first signal format, and the first signal format is used to indicate that both the first radio frame and the second radio frame use the TDD uplink-downlink subframe configuration.

The first indication information included in the NPSS may be specifically information including one or more bits. For example, the NPSS includes 2-bit information (for example, 11). In this case, if the NPSS includes the first indication information, and the first indication information is 11, it indicates that both the first radio frame and the second radio frame use the TDD uplink-downlink subframe configuration, that is, the base station uses the TDD technology.

The NPSS provided in this embodiment of the present invention is a signal obtained through coding. For example, the NPSS may be obtained by coding related data by using a spreading code. When the HD-FDD technology is used, the spreading code of the NPSS is a sequence (1, 1, 1, 1, −1, −1, 1, 1, 1, −1, 1). In this case, when the TDD technology is used, the signal format of the NPSS may be designed to be a signal format different from that in the HD-FDD technology. For example, when the TDD technology is used, the spreading code of the NPSS is a sequence (1, 1, 1, 1, 1, 1, −1, −1, −1, −1, −1). In other words, the first signal format is a spreading code represented by the sequence (1, 1, 1, 1, 1, 1, −1, −1, −1, −1, −1). Therefore, the first signal format may be used to indicate that both the first radio frame and the second radio frame use the TDD uplink-downlink subframe configuration, that is, the base station uses the TDD technology. In this way, the UE can be supported in determining that the first radio frame and the second radio frame use the TDD uplink-downlink subframe configuration.

After the base station sends the NPSS, the NSSS, the NPBCH, and the SIB1-NB to the UE, the UE may receive the NPSS, the NSSS, the NPBCH, and the SIB1-NB and separately detect the NPSS, the NSSS, the NPBCH, and the SIB1-NB.

It should be noted that, according to the data transmission method provided in this embodiment of this application, it can indicate that both the first radio frame and the second radio frame that are used when the base station sends the downlink signal to the UE use the TDD uplink-downlink subframe configuration. In this way, when receiving the NPSS, the NSSS, the NPBCH, and the SIB1-NB that are sent by the base station, the UE can determine that the TDD uplink-downlink subframe configuration is used for sending the NPSS, the NSSS, the NPBCH, and the SIB1-NB. This helps reduce complexity of detecting the NPSS, the NSSS, the NPBCH, and the SIB1-NB by the UE.

Specifically, the data transmission method provided in this embodiment of the present invention may include the foregoing steps 501 to 504. In addition, after step 504, the method may further include steps 601 to 605. For example, the method shown in FIG. 6 may further include steps 601 to 605 after step 504.

S501. The base station sends an NPSS to the UE by using a first subframe in a first radio frame and a first subframe in a second radio frame.

S502. The base station sends an NPBCH to the UE by using a second subframe in the first radio frame and a second subframe in the second radio frame.

S503. The base station sends an NSSS to the UE by using a third subframe in the first radio frame.

S504. The base station sends a SIB1-NB to the UE by using a third subframe in the second radio frame.

S601. The UE receives, in the first subframe in the first radio frame and the first subframe in the second radio frame, the NPSS sent by the base station.

S602. The UE receives, in the second subframe in the first radio frame and the second subframe in the second radio frame, the NPBCH sent by the base station.

S603. The UE receives, in the third subframe in the first radio frame, the NSSS sent by the base station.

S604. The UE receives, in the third subframe in the second radio frame, the SIB1-NB sent by the base station.

S605. If the first subframe and the third subframe in the first radio frame are separated by a subframes, or the NPSS includes first indication information, or a signal format of the NPSS is a first signal format, the UE determines that both the first radio frame and the second radio frame use a TDD uplink-downlink subframe configuration.

For example, with reference to FIG. 1 and FIG. 4, the foregoing steps 601 to 604 may be performed by the communications interface 43 of the UE 121 shown in FIG. 1; and the foregoing step 605 may be performed by the processor 41 of the UE 121 shown in FIG. 1.

Herein, a is a natural number, a is not equal to 3 and is less than 9, the first indication information is used to indicate that both the first radio frame and the second radio frame use the TDD uplink-downlink subframe configuration, and the first signal format is used to indicate that both the first radio frame and the second radio frame use the TDD uplink-downlink subframe configuration.

Figure 6:
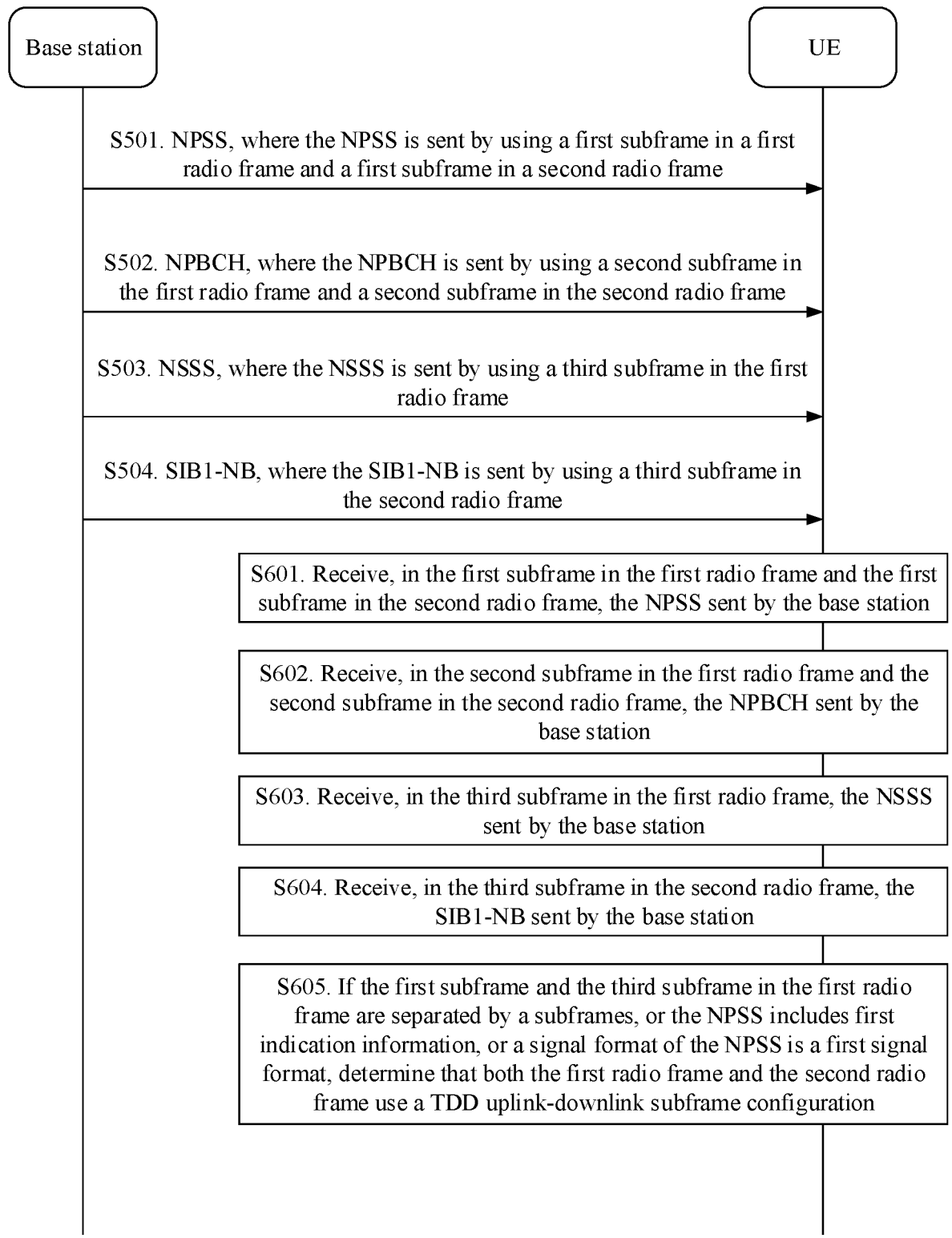
FIG. 6 is a schematic flowchart 2 of a data transmission method according to an embodiment of the present invention.

Certainly, the data transmission method shown in FIG. 6 may further perform the foregoing step 501' before step 501.

S501'. The base station obtains the NPSS, the NSSS, the NPBCH, and the SIB1-NB.

Specifically, in a process of obtaining the NPSS, the NSSS, the NPBCH, and the SIB1-NB by the base station, the base station may construct the NPSS, the NSSS, the NPBCH, and the SIB1-NB, design signal formats of the NPSS, the NSSS, the NPBCH, and the SIB1-NB, and add some indication information to each downlink signal. For example, the base station may construct the NPSS, the NSSS, the NPBCH, and the SIB1-NB to be sent on a symbol 3 to a symbol 13 in a subframe, design the signal formats of the NPSS, the NSSS, the NPBCH, and the SIB1-NB as the first signal format, and add the first indication information to the NPSS.

For example, the base station may further add 3-bit configuration indication information to the NPBCH. The configuration indication information is used to indicate a TDD uplink-downlink subframe configuration used by the radio frame. For example, the configuration indication information is sequentially values in 000 to 110, and respectively indicates that the TDD uplink-downlink subframe configuration used by the radio frame is UL-DL (0), UL-DL (1), UL-DL (2), UL-DL (3), UL-DL (4), UL-DL (5), or UL-DL (6) shown in Table 1.

When the TDD uplink-downlink subframe configuration is used, the UE may distinguish between the first radio frame and the second radio frame based on the NPSS. In addition, because subframe numbers of the first subframe, the second subframe, and the third subframe in each of the first radio frame and the second radio frame are determined, the UE may distinguish between the first subframe in the first radio frame and the first subframe in the second radio frame based on the NPSS, and further distinguish between the second subframe in the first radio frame and the second subframe in the second radio frame, and the third subframe in the first radio frame and the third subframe in the second radio frame.

It can be figured out that, the method provided in the foregoing embodiment may further include step 606 after step 604.

S606. If the first subframe and the third subframe in the first radio frame are separated by three subframes, or the NPSS does not include first indication information, or a signal format of the NPSS is not the first signal format, the UE determines that both the first radio frame and the second radio frame use an HD-FDD technology.

For example, with reference to FIG. 1 and FIG. 4, the foregoing step 606 may be performed by the processor 41 of the UE 121 shown in FIG. 1.

It should be noted that, because the UE may determine that the radio frame in which the NPSS, the NSSS, the NPBCH, and the SIB1-NB are sent uses the TDD uplink-downlink subframe configuration, the UE may detect a corresponding downlink signal in a subframe corresponding to the TDD uplink-downlink subframe configuration, for example, detect the NPSS in a first subframe in one radio frame, and detect the NSSS in a third subframe. Certainly, the UE may further send an uplink signal to the base station by using the radio frame using the TDD uplink-downlink subframe configuration. In this way, spectrum resource utilization in data transmission between the base station and the UE in the NB-IoT system can be improved.

In another embodiment of this application, in the first radio frame and the second radio frame, the first subframe, the second subframe, and the third subframe each are a downlink subframe. For example, the first subframe, the second subframe, and the third subframe each may be a subframe represented by "D" shown in Table 1.

In this case, according to the data transmission method provided in this embodiment of the present invention, TDD uplink-downlink subframe configurations applied in the NB-IoT system can support six TDD uplink-downlink subframe configurations: UL-DL(1), UL-DL(2), UL-DL(3), UL-DL(4), UL-DL(5), and UL-DL(6); while when the TDD technology is applied in the NB-IoT system, all subframes in one radio frame are used to transmit a downlink signal or an uplink signal. Therefore, in the NB-IoT system supporting the TDD technology, flexibility in selecting an uplink-downlink subframe configuration when the base station sends the downlink signal to the UE to be relatively high.

In this case, when the TDD uplink-downlink subframe configuration is used, because the first subframe, the second subframe, and the third subframe all are a downlink subframe, a symbol 3 to a symbol 13 of each subframe in the first subframe, the second subframe, and the third subframe may be used to send the downlink signal. Therefore, a downlink signal existing when the TDD technology is used is of same construction as a downlink signal existing when the HD-FDD technology is used, that is, each is constructed in the symbol 3 to the symbol 13 in a subframe. In this way, complexity of constructing the NPSS, the NSSS, the NPBCH, and the SIB1-NB by the base station is reduced.

In addition, after receiving the downlink signal sent by the base station, the UE is enabled to detect the downlink signal on the symbol 3 to the symbol 13 in a subframe in which the downlink signal is located regardless of whether the subframe uses the HD-FDD technology or the TDD technology. This can reduce complexity of detecting the NPSS, the NSSS, the NPBCH, and the SIB1-NB by the UE.

For example, in a possible implementation, a combination of the first subframe, the second subframe, and the third subframe may be in any one of the following six configurations:

configuration 1: the first subframe is a subframe 0, the second subframe is a subframe 5, and the third subframe is a subframe 9;

configuration 2: the first subframe is the subframe 0, the second subframe is the subframe 9, and the third subframe is the subframe 5;

configuration 3: the first subframe is the subframe 5, the second subframe is the subframe 0, and the third subframe is the subframe 9;

configuration 4: the first subframe is the subframe 5, the second subframe is the subframe 9, and the third subframe is the subframe 0;

configuration 5: the first subframe is the subframe 9, the second subframe is the subframe 0, and the third subframe is the subframe 5; and configuration 6: the first subframe is the subframe 9, the second subframe is the subframe 5, and the third subframe is the subframe 0.

When a combination of the first subframe, the second subframe, and the third subframe are any combination of the subframe 0, the subframe 5, and the subframe 9, the NB-IoT system can support six TDD uplink-downlink subframe configurations: UL-DL (1), UL-DL (2), UL-DL (3), UL-DL (4), UL-DL (5), and UL-DL (6). This makes flexibility in selecting an uplink-downlink subframe configuration when the base station sends the downlink signal to the UE in the NB-IoT system to be relatively high.

The subframe 0, the subframe 5, and the subframe 9 each include a symbol 0 to a symbol 13. The symbol 3 to the symbol 13 in the subframe 0 may be used to send the NPSS, the NSSS, the NPBCH, or the SIB1-NB; the symbol 3 to the symbol 13 in the subframe 5 are used to send the NPSS, the NSSS, the NPBCH, or the SIB1-NB; and the symbol 3 to the symbol 13 in the subframe 9 are used to send the NPSS, the NSSS, the NPBCH, or the SIB1-NB.

Figure 7:
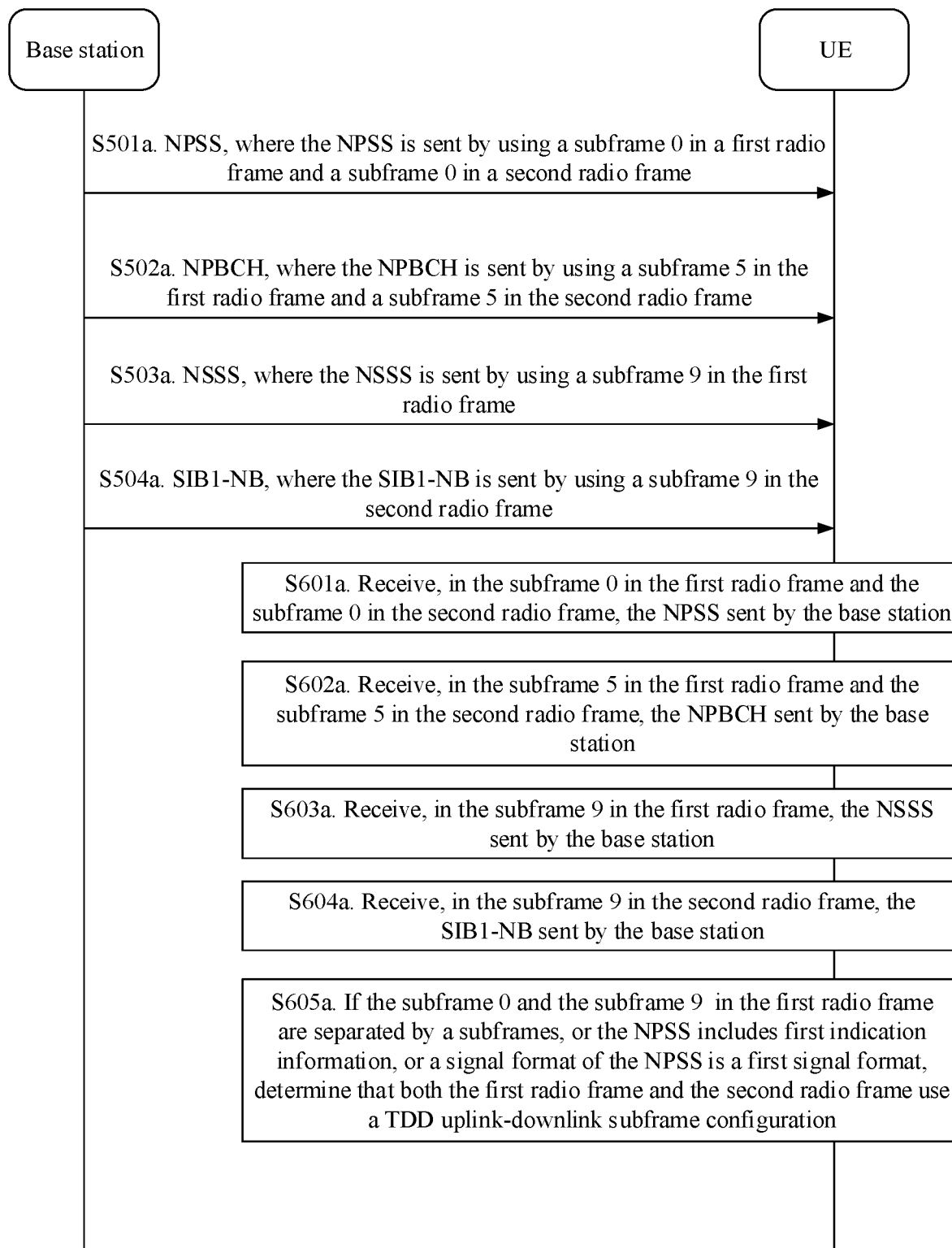
FIG. 7 is a schematic flowchart 3 of a data transmission method according to an embodiment of the present invention.

Specifically, when the base station sends an NPSS, or an NSSS, or an NPBCH, or a SIB1-NB to the UE by using a radio frame using the foregoing configuration 1, the data transmission method provided in this embodiment of the present invention may include step 501a to step 504a and step 601a to step 605a with reference to the foregoing step 501 to step 504, and step 601 to step 605. For example, as shown in FIG. 7, the data transmission method provided in this embodiment of the present invention may include step 501a to step 504a, and step 601a to step 605a.

S501a. The base station sends an NPSS to the UE by using a subframe 0 in a first radio frame and a subframe 0 in a second radio frame.

S502a. The base station sends an NPBCH to the UE by using a subframe 5 in the first radio frame and a subframe 5 in the second radio frame.

S503a. The base station sends an NSSS to the UE by using a subframe 9 in the first radio frame.

S504a. The base station sends a SIB1-NB to the UE by using the subframe 9 in the second radio frame.

S601a. The UE receives, in the subframe 0 in the first radio frame and the subframe 0 in the second radio frame, the NPSS sent by the base station.

S602a. The UE receives, in the subframe 5 in the first radio frame and the subframe 5 in the second radio frame, the NPBCH sent by the base station.

S603a. The UE receives, in the subframe 9 in the first radio frame, the NSSS sent by the base station.

S604a. The UE receives, in the subframe 9 in the second radio frame, the SIB1-NB sent by the base station.

S605a. If the subframe 0 and the subframe 9 in the first radio frame are separated by a subframes, or the NPSS includes first indication information, or a signal format of the NPSS is a first signal format, the UE determines that both the first radio frame and the second radio frame use a TDD uplink-downlink subframe configuration.

Certainly, the data transmission method shown in FIG. 7 may further perform the foregoing step 501' before step 501a.

S501'. The base station obtains the NPSS, the NSSS, the NPBCH, and the SIB1-NB.

Figure 8:
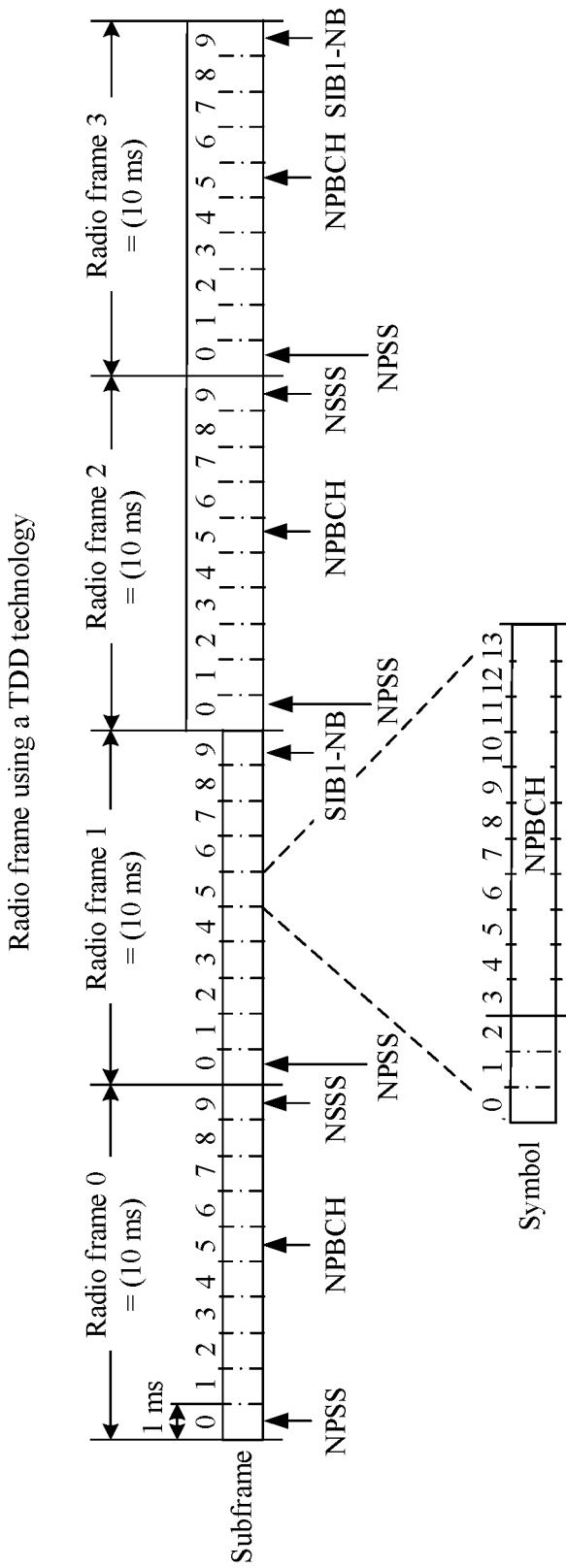
FIG. 8 is a schematic structural diagram 2 of a radio frame according to an embodiment of the present invention.

For example, FIG. 8 is a schematic structural diagram of another radio frame according to this embodiment of the present invention. In FIG. 8, a radio frame 0 and a radio frame 2 may be the first radio frame, and a radio frame 1 and a radio frame 3 may be the second radio frame. A subframe 0 is used to send the NPSS on a symbol 0 to a symbol 13 in the subframe 0. A subframe 5 is used to send the NPBCH, and the NPBCH is sent by on a symbol 0 to a symbol 13 in the subframe 3. The subframe 9 is used to alternately send the NSSS and the SIB1-NB, and the NSSS and the SIB1-NB are sent on a symbol 0 to a symbol 13 in the subframe 9. In this case, the subframe 0 and the subframe 9 are separated by eight subframes, that is, a is equal to 8, and that a is not equal to 3 and less than 9 is met.

In this way, complexity of constructing the NPSS, the NSSS, the NPBCH, and the SIB1-NB by the base station is reduced. In addition, after receiving a downlink signal sent by the base station, the UE is enabled to detect the NPSS on the symbol 3 to the symbol 13 in the subframe 0, detect the NPBCH on the symbol 3 to the symbol 13 in the subframe 5, and detect the NSSS and the SIB1-NB on the symbol 3 to the symbol 13 in the subframe 9 regardless of whether a subframe in which the downlink signal is located uses the HD-FDD technology or the TDD technology. In this way, complexity of detecting the NPSS, NPBCH, NSSS, and SIB1-NB by the UE is reduced, and stable operation of the UE is facilitated.

Specifically, the UE may blindly detect, in the first radio frame, that a subframe in which the NPSS is located is the subframe 0, and that a subframe in which the NSSS is located is the subframe 9; and determine that the subframe 0 and the subframe 9 are separated by eight subframes, where 8 is not equal to 3 and less than 9. Subsequently, the UE may detect the NPBCH in the subframe 5 of the first radio frame and the subframe 5 of the second radio frame based on the foregoing configuration 1, and detect the SIB1-NB in the subframe 9 of the second radio frame.

Alternatively, the UE may blindly detect, in the first radio frame, that a subframe in which the NPSS is located is the subframe 0, and determine that the NPSS includes the first indication information, or determine that a signal format of the NPSS is the first signal format. Subsequently, the UE may detect the NSSS in the subframe 9 of the first radio frame, detect the NPBCH in the subframe 5 of the first radio frame and the subframe 5 of the second radio frame, and detect the SIB1-NB in the subframe 9 of the second radio frame based on the foregoing configuration 1.

Similarly, when the base station sends the NPSS, or the NSSS, or the NPBCH, or the SIB1-NB to the UE by using a radio frame using the foregoing configuration 2, configuration 4, and configuration 6, steps included in the data transmission method provided in this embodiment of the present invention are similar to step 501*a* to step 504*a* and step 601*a* to step 605*a* shown in FIG. 7, and details are not described herein again in this embodiment of the present invention.

Figure 9:
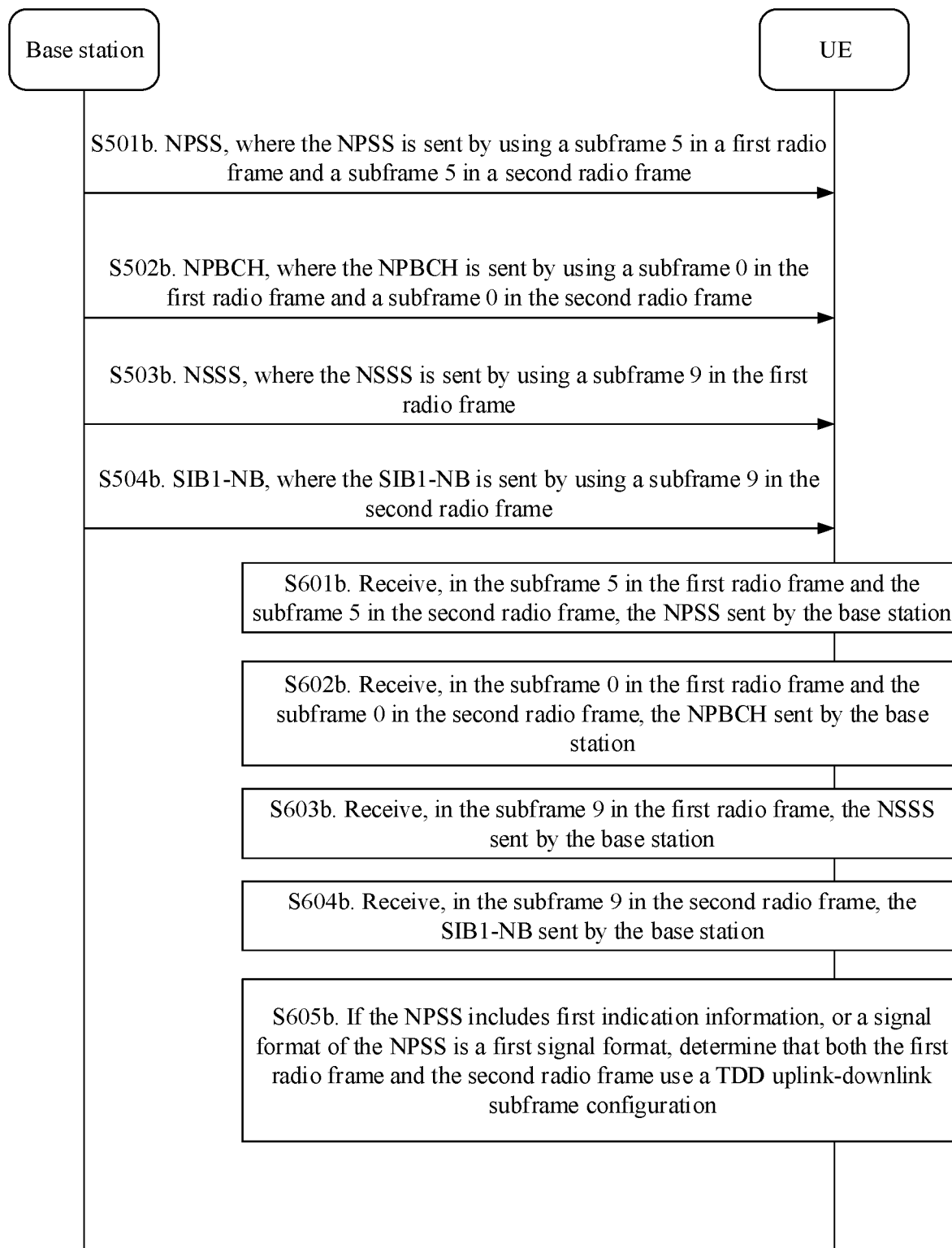
FIG. 9 is a schematic flowchart 4 of a data transmission method according to an embodiment of the present invention.

In addition, when a base station sends an NPSS, an NSSS, an NPBCH, or a SIB1-NB to UE by using a radio frame using the foregoing configuration 3, the data transmission method provided in this embodiment of the present invention may include step 501*b* to step 504*b* and step 601*b* to step 605*b* with reference to the foregoing step 501 to step 504 and step 601 to step 605. For example, as shown in FIG. 9, the data transmission method provided in this embodiment of the present invention may include step 501*b* to step 504*b*, and step 601*b* to step 605*b*.

S501*b*. The base station sends an NPSS to the UE by using a subframe 5 in a first radio frame and a subframe 5 in a second radio frame.

S502*b*. The base station sends an NPBCH to the UE by using a subframe 0 in the first radio frame and a subframe 0 in the second radio frame.

S503*b*. The base station sends an NSSS to the UE by using a subframe 9 in the first radio frame.

S504*b*. The base station sends a SIB1-NB to the UE by using a subframe 9 in the second radio frame.

S601*b*. The UE receives, in the subframe 5 in the first radio frame and the subframe 5 in the second radio frame, the NPSS sent by the base station.

S602*b*. The UE receives, in the subframe 0 in the first radio frame and the subframe 0 in the second radio frame, the NPBCH sent by the base station.

S603*b*. The UE receives, in the subframe 9 in the first radio frame, the NSSS sent by the base station.

S604*b*. The UE receives, in the subframe 9 in the second radio frame, the SIB1-NB sent by the base station.

S605*b*. If the NPSS includes first indication information, or a signal format of the NPSS is a first signal format, the UE determines that both the first radio frame and the second radio frame use a TDD uplink-downlink subframe configuration.

A first subframe is a subframe 5, a third subframe is a subframe 9, and the subframe 5 and the subframe 9 are separated by three subframes. Therefore, the UE does not need to perform the step of determining "that the first subframe in the first radio frame and the third subframe in the first radio frame are separated by a subframes". Therefore, in the method shown in FIG. 9, the foregoing step 605 may be replaced with step 605*b*.

Certainly, the data transmission method shown in FIG. 9 may further perform the foregoing step 501' before step 501*b*.

S501'. The base station obtains the NPSS, the NSSS, the NPBCH, and the SIB1-NB.

Figure 10:
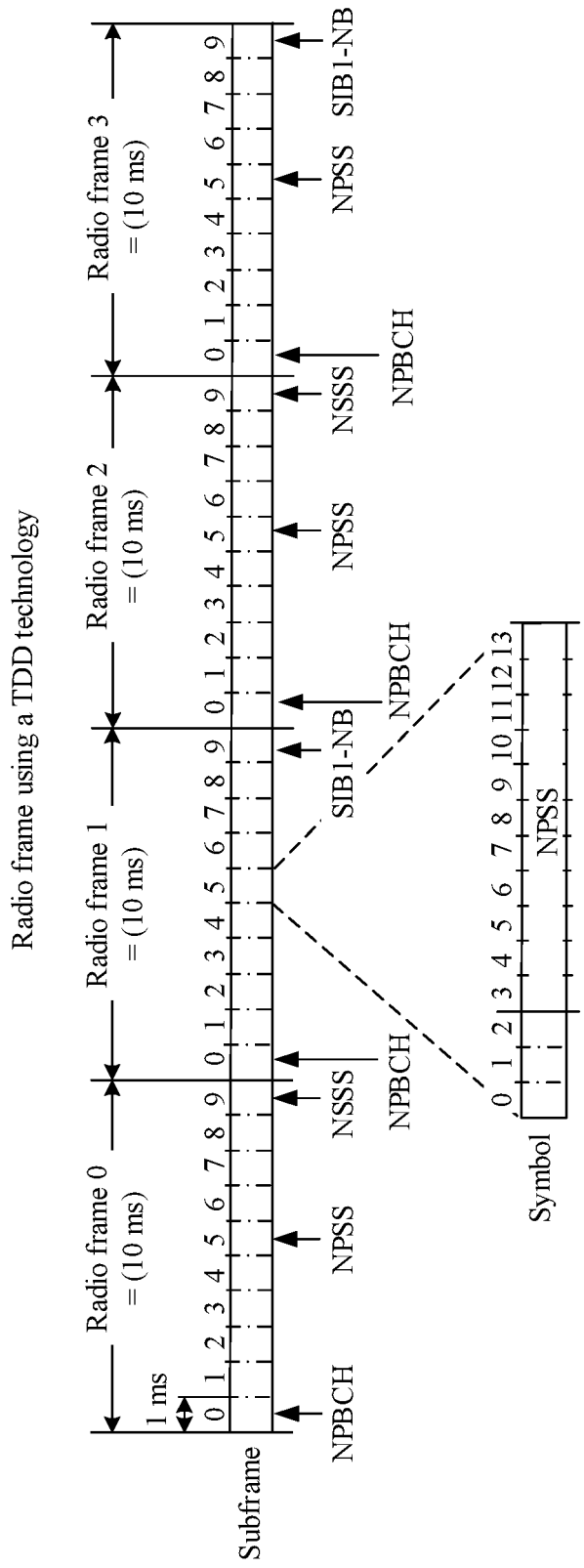
FIG. 10 is a schematic structural diagram 3 of a radio frame according to an embodiment of the present invention.

For example, FIG. 10 is a schematic structural diagram of still another radio frame according to this embodiment of the present invention. In FIG. 10, a radio frame 0 and a radio frame 2 may be the first radio frame, and a radio frame 1 and a radio frame 3 may be the second radio frame. A subframe 5 is used to send the NPSS, a subframe 0 is used to send the NPBCH, and a subframe 9 is used to alternately send the NSSS and the SIB1-NB.

Some downlink signals when a TDD technology is used are of same construction as a downlink signal when an HD-FDD technology is used, that is, each is constructed in a symbol 3 to a symbol 13 in a subframe. In this way, complexity of constructing the NPSS, the NSSS, the NPBCH, and the SIB1-NB by the base station is reduced.

Specifically, the UE may blindly detect, in the first radio frame, that a subframe in which the NPSS is located is the subframe 5, and determine that the NPSS includes the first indication information, or determine that a signal format of the NPSS is the first signal format. Subsequently, the UE may detect the NSSS in the subframe 9 of the first radio frame, detect the NPBCH in the subframe 0 of the first radio frame and the subframe 0 of the second radio frame, and detect the SIB1-NB in the subframe 9 of the second radio frame based on the foregoing configuration 3.

In this way, complexity of constructing the NPSS, the NSSS, the NPBCH, and the SIB1-NB by the base station is reduced. In addition, after receiving the downlink signal sent by the base station, the UE is enabled to detect the NPSS on the symbol 3 to the symbol 13 in the subframe 5, detect the NPBCH on the symbol 3 to the symbol 13 in the subframe 0, and detect the NSSS and the SIB1-NB on the symbol 3 to the symbol 13 in the subframe 9 regardless of whether a subframe in which the downlink signal is located uses the HD-FDD technology or the TDD technology. In this way, complexity of detecting the NPSS, the NSSS, the NPBCH, and the SIB1-NB by the UE is reduced.

Similarly, when the base station sends the NPSS, NSSS, NPBCH, or SIB1-NB to the UE by using a radio frame using the foregoing configuration 5, steps included in the data transmission method provided in this embodiment of the present invention are similar to step 501*b* to step 504*b* and step 601*b* to step 605*b* shown in FIG. 9, and details are not described herein again in this embodiment of the present invention.

Certainly, a combination of the first subframe, the second subframe, and the third subframe that are provided in this embodiment of the present invention are not limited to the foregoing six configurations from configuration 1 to configuration 6, and may be another configuration. For example, the first subframe is a subframe 0, the second subframe is a subframe 5, and the third subframe is a subframe 8. In this case, the data transmission method provided in this embodiment of the present invention may support the four TDD uplink-downlink subframe configurations: UL-DL (2), UL-DL (3), UL-DL (4), and UL-DL (5) shown in Table 1. For detailed descriptions about that a combination of the first subframe, the second subframe, and the third subframe that are provided in this embodiment of the present invention uses another configuration other than the foregoing configurations 1 to 6, refer to the foregoing detailed descriptions about configurations 1 to 6. Details are not described in this embodiment of the present invention again.

In another embodiment of this application, in the first radio frame and the second radio frame, the first subframe and the third subframe each are a downlink subframe. The second subframe in the first radio frame includes two special subframes in the first radio frame, and the second subframe may be used to send the downlink signal. Therefore, some downlink signals existing when the TDD technology is used are of same construction as a downlink signal existing when an HD-FDD technology is used, that is, each is constructed in the symbol 3 to the symbol 13 in a subframe. In this way, after receiving the some downlink signals sent by the base station, the UE is enabled to detect the downlink signals on the symbol 3 to the symbol 13 in related subframes regardless of whether subframes in which the downlink signals are located use the HD-FDD technology or the TDD technology. In this way, complexity of detecting an NPSS, an NSSS, an NPBCH, and a SIB1-NB by the UE is reduced.

Table 2 is a special subframe configuration table provided in this embodiment of the present invention.

TABLE 2

Special subframe configuration table

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Normal cyclic prefix in uplink |
| 0 | 6592 · Ts | (1 + X) · x | (1 + X) · x | 7680 | (1 + X) x | (1 + X) · x |
| 1 | 19760 · Ts | 2192 · Ts | 2560 · Ts | 20480 · Ts | 2192 · Ts | 2560 · Ts |
| 2 | 21952 · Ts | | | 23040 · Ts | | |
| 3 | 24144 · Ts | | | 23040 · Ts | | |
| 4 | 26336 · Ts | | | 7680 · Ts | (2 + X) x | (2 + X) x |
| 5 | 65 92 · Ts | (2 + X) · x | (2 + X) · x | 7680 · Ts | 2192 · Ts | 2560 · Ts |
| 6 | 19760 · Ts | 2192 · Ts | 2560 · Ts | 20480 · Ts | | |
| 7 | 21952 · Ts | | | 12800 · Ts | | |
| 8 | 24144 · Ts | | | | | |
| 9 | 13168 · Ts | | | | | |
| 10 | 13168 · Ts | 13152 · Ts | 12800 · Ts | | | | in the second radio frame includes two special subframes in the radio frame 2; or the second subframe in the first radio frame includes a special subframe and a downlink subframe in the first radio frame, and the second subframe in the second radio frame includes a special subframe and a downlink subframe in the second radio frame. For example, the first subframe and the third subframe each may be a subframe represented by "D" shown in Table 1, and the second subframe may be a subframe represented by "S" or "D" shown in Table 1.

In this case, a data transmission method provided in this embodiment of this application can support seven TDD uplink-downlink subframe configurations: UL-DL(O), UL-DL(1), UL-DL(2), UL-DL(3), UL-DL(4), UL-DL(5), and UL-DL(6); while when a TDD technology is applied to an NB-IoT system, all subframes in one radio frame are used to transmit a downlink signal or an uplink signal. Therefore, the NB-IoT system can apply all TDD uplink-downlink subframe configurations in the LTE system. This makes flexibility in selecting an uplink-downlink subframe configuration when a base station sends the downlink signal to UE to be relatively high.

In this case, when the TDD uplink-downlink subframe configuration is used, because the first subframe and the third subframe each are a downlink subframe (for example, a subframe 0 or a subframe 5), a symbol 3 to a symbol 13 of each subframe in the first subframe and the third subframe As shown in Table 2, the special subframe configuration table may include 11 special subframe configurations. One special subframe includes three fields, namely, a downlink pilot time slot (DwPTS), a guard period (GP), and an uplink pilot time slot (UpPTS). A length of the DwPTS may be configured as 3 to 12 symbols, and is used for common transmission of a downlink control channel and a downlink shared channel. For example, in special subframe configuration 0, duration of the DwPTS is 6592·Ts, namely, three symbols. In special subframe configuration 4, duration of the DwPTS is 26336·Ts, namely, 12 symbols. Ts=1/(15000× 2048) second(s). A length of the UpPTS may be configured to be one to two symbols, and may be used to carry an uplink physical random access channel, and the like. A GP is a guard period used for switching between uplink and downlink.

Specifically, with reference to the TDD uplink-downlink subframe configuration shown in Table 1, when the special subframe is a subframe 1, a symbol 0 and a symbol 1 in the subframe 1 may not be used to transmit data, and a symbol 2 to a symbol 11 may be used to transmit data. When the special subframe is a subframe 6, a symbol 0 to a symbol 2 in the subframe 6 may not be used to transmit data, and a symbol 3 to a symbol 11 in the subframe 6 may be used to transmit data.

For example, in a possible implementation, a combination of the first subframe, the second subframe, and the third subframe may be in any one of the following two configurations:

configuration 7: the first subframe is the subframe 0, the second subframe includes the subframe 1 and the subframe 6, and the third subframe is the subframe 5; and configuration 8: the first subframe is the subframe 5, the second subframe includes the subframe 1 and the subframe 6, and the third subframe is the subframe 0.

When the first subframe and the third subframe are any combination of the subframe 0 and the subframe 5, and the second subframe includes the subframe 1 and the subframe 6, the NB-IoT system can support seven TDD uplink-downlink subframe configurations: UL-DL (0), UL-DL (1), UL-DL (2), UL-DL (3), UL-DL (4), UL-DL (5), and UL-DL (6). This makes flexibility in selecting an uplink-downlink subframe configuration when the base station sends the downlink signal to the UE in the NB-IoT system to be relatively high.

The subframe 0, the subframe 1, the subframe 5, and the subframe 6 each include a symbol 0 to a symbol 13. The symbol 3 to the symbol 13 in the subframe 0 are used to transmit the NPSS, or the NSSS, or the SIB1-NB; b symbols in the symbol 2 to the symbol 11 in the subframe 1 and c symbols in the symbol 3 to the symbol 11 in the subframe 6 are used to send the NPBCH, where b is greater than or equal to 4 and less than or equal to 10, c is greater than or equal to 3 and less than or equal to 9, and b+c is greater than or equal to 7 and less than or equal to 11. The symbol 3 to the symbol 13 in the subframe 5 are used to send the NPSS, or the NSSS, or the SIB1-NB.

It should be noted that, in this embodiment of the present invention, when the TDD uplink-downlink subframe configuration is used, the provided second subframe includes the subframe 1 and the subframe 6, and the NPBCH is sent in the second subframe. Therefore, signal construction of the NPBCH may be different from signal construction of the NPBCH when the HD-FDD technology is used. The construction of the NPBCH may be in two subframes, for example, in a symbol 2 to a symbol 4 of one subframe and a symbol 3 to a symbol 7 of another subframe, that is, b is equal to 3, and c is equal to 5.

Figure 11:
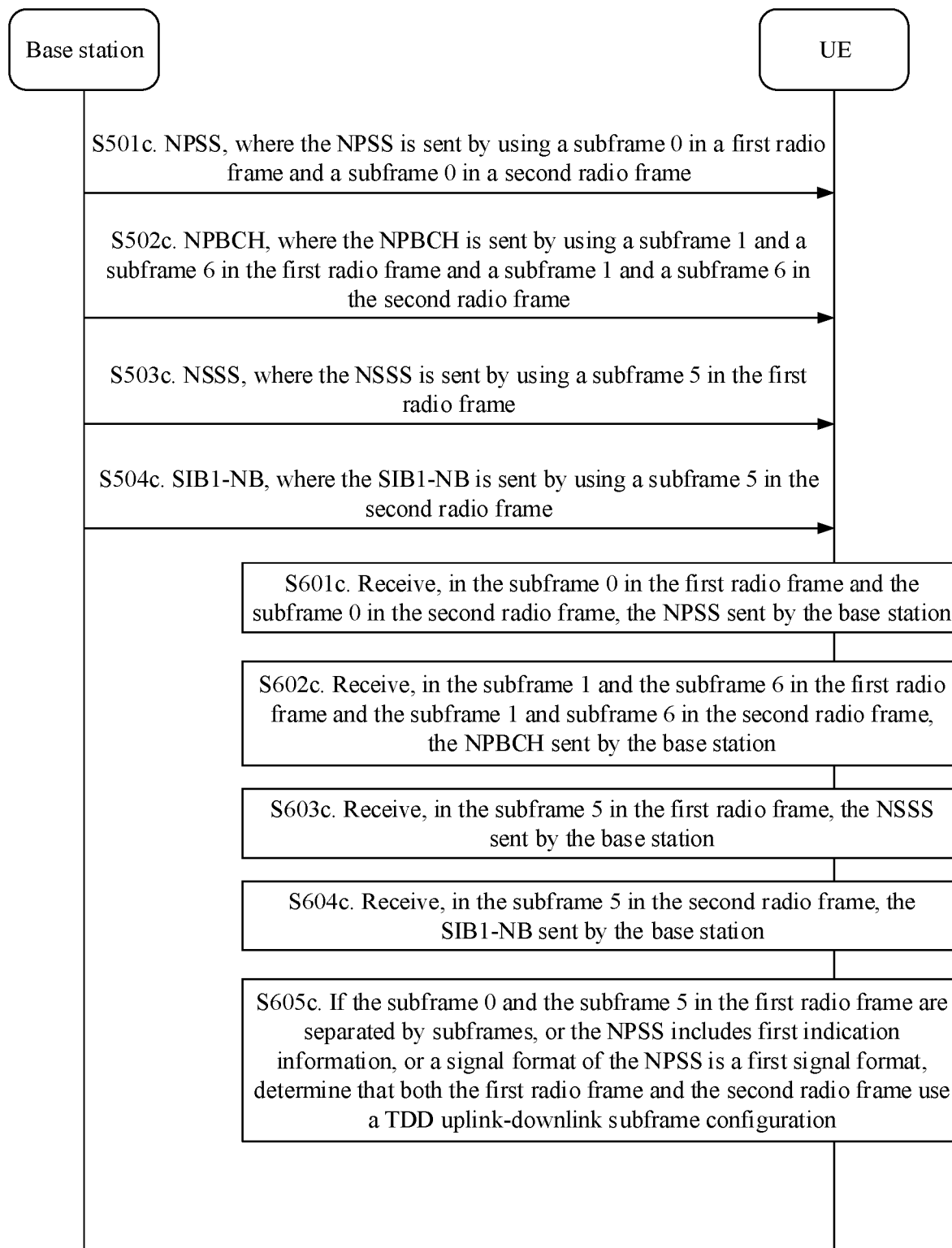
FIG. 11 is a schematic flowchart 5 of a data transmission method according to an embodiment of the present invention.

Specifically, when the base station sends an NPSS, or an NSSS, or an NPBCH, or a SIB1-NB to the UE by using a radio frame using the foregoing configuration 7, the data transmission method provided in this embodiment of the present invention may make reference to the foregoing step 501 to step 504 and step 601 to step 605. For example, as shown in FIG. 11, the data transmission method provided in this embodiment of the present invention may include step 501c to step 504c, and step 601c to step 605c.

S501c. The base station sends an NPSS to the UE by using a subframe 0 in a first radio frame and a subframe 0 in a second radio frame.

S502c. The base station sends an NPBCH to the UE by using a subframe 1 and a subframe 6 in the first radio frame and a subframe 1 and a subframe 6 in the second radio frame.

S503c. The base station sends an NSSS to the UE by using a subframe 5 in the first radio frame.

S504c. The base station sends a SIB1-NB to the UE by using a subframe 5 in the second radio frame.

S601c. The UE receives, in the subframe 0 in the first radio frame and the subframe 0 in the second radio frame, the NPSS sent by the base station.

S602c. The UE receives, in the subframe 1 and the subframe 6 in the first radio frame and the subframe 1 and the subframe 6 the second radio frame, the NPBCH sent by the base station.

S603c. The UE receives, in the subframe 5 in the first radio frame, the NSSS sent by the base station.

S604c. The UE receives, in the subframe 5 in the second radio frame, the SIB1-NB sent by the base station.

S605c. If the subframe 0 and the subframe 1 in the first radio frame are separated by a subframes, or the NPSS includes first indication information, or a signal format of the NPSS is a first signal format, the UE determines that both the first radio frame and the second radio frame use a TDD uplink-downlink subframe configuration.

Certainly, the data transmission method shown in FIG. 11 may further perform the foregoing step 501' before step 501c.

S501'. The base station obtains the NPSS, the NSSS, the NPBCH, and the SIB1-NB.

Figure 12:
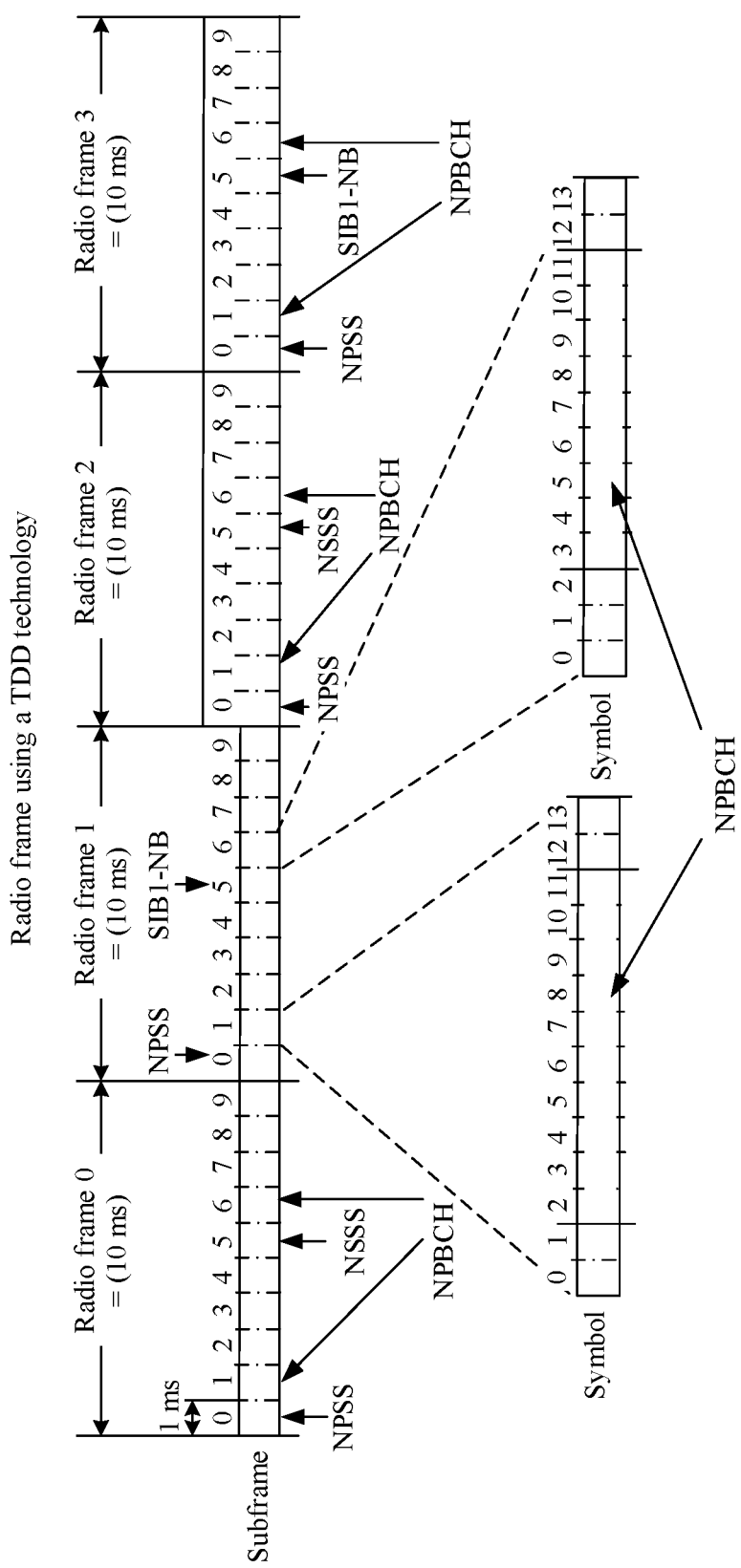
FIG. 12 is a schematic structural diagram 4 of a radio frame according to an embodiment of the present invention.

For example, FIG. 12 is a schematic structural diagram of yet another radio frame according to this embodiment of the present invention. In FIG. 12, a radio frame 0 and a radio frame 2 may be the first radio frame, and a radio frame 1 and a radio frame 3 may be the second radio frame. The subframe 0, the subframe 1, the subframe 5, and the subframe 6 each include a symbol 0 to a symbol 13. The subframe 0 is used to send the NPSS on the symbol 3 to the symbol 13 of subframe 0. The subframe 1 and the subframe 6 are used to send the NPBCH on b symbols in the symbol 2 to the symbol 11 in the subframe 1 and c symbols in the symbol 3 to the symbol 11 in the subframe 6. The subframe 5 is used to send the NSSS or SIB1-NB on the symbol 3 to the symbol 13 in the subframe 5.

Specifically, the UE may blindly detect, in the first radio frame, that a subframe in which the NPSS is located is the subframe 0, and that a subframe in which the NSSS is located is the subframe 5; and determine that the subframe 0 and the subframe 5 are separated by four subframes, where 4 is not equal to 3 and less than 9. Subsequently, the UE may detect the NPBCH in the subframe 1 and the subframe 6 of the first radio frame and the subframe 1 and the subframe 6 of the second radio frame, and detect the SIB1-NB in the subframe 5 of the second radio frame based on the foregoing configuration 7.

Alternatively, the UE may blindly detect, in the first radio frame, that a subframe in which the NPSS is located is the subframe 0, and determine that the NPSS includes the first indication information, or determine that a signal format of the NPSS is the first signal format. Subsequently, the UE may detect the NPBCH in the subframe 1 and the subframe 6 of the first radio frame and the subframe 1 and the subframe 6 of the second radio frame, and detect the SIB1-NB in the subframe 5 of the second radio frame based on the foregoing configuration 7.

Similarly, when the base station sends the NPSS, or the NSSS, or the NPBCH, or the SIB1-NB to the UE by using a radio frame using the foregoing configuration 8, steps included in the data transmission method provided in this embodiment of the present invention are similar to step 501c to step 504c and step 601c to step 605c shown in FIG. 11, and details are not described herein again in this embodiment of the present invention.

Because the base station can use all TDD uplink-downlink subframe configurations to send a downlink signal, and can also use all of the 11 special subframe configurations, flexibility in selecting an uplink-downlink subframe configuration when the base station sends the downlink signal to the UE is relatively high, and quality and synchronization of the downlink signals sent by the base station to the UE is improved.

It can be figured out that, although only that the subframe 1 and the subframe 6 are used to send the NPBCH is described in the foregoing embodiment, the subframe 1 and the subframe 6 may also be used to send the NPSS, or the NSSS, or the SIB1-NB. For descriptions of the solution "the subframe 1 and the subframe 6 are also used to send the NPSS, or the NSSS, or the SIB1-NB", refer to step 501*c* to step 504*c* and step 601*c* to step 605*c*, and effects that can be implemented by these steps in the foregoing embodiment. Details are not described in this embodiment of the present invention again.

In another embodiment of this application, a data transmission method is provided, to implement that when sending a downlink signal to UE, a base station can use all of the seven TDD uplink-downlink subframe configurations, and therefore implement flexibility in selecting an uplink-downlink subframe configuration when the base station sends the downlink signal to the UE. According to the data transmission method provided in this embodiment of the present invention, the base station may alternatively send an NPSS by using a first subframe in a first radio frame, send an NSSS by using the first subframe in the first radio frame, send an NPBCH by using a first subframe in a second radio frame, and send the SIB1-NB by using a second subframe in the second radio frame.

For example, in a possible implementation, a combination of the first subframe and the second subframe may be the following configuration:

Configuration 9: the first subframe is a subframe 0, and the second subframe is a subframe 5.

It can be figured out that, the configuration of the first subframe and the second subframe may also be a configuration other than configuration 9. For example, the first subframe is the subframe 0, and the second subframe is a subframe 9. Details are not described in this embodiment of the present invention.

Figure 13:
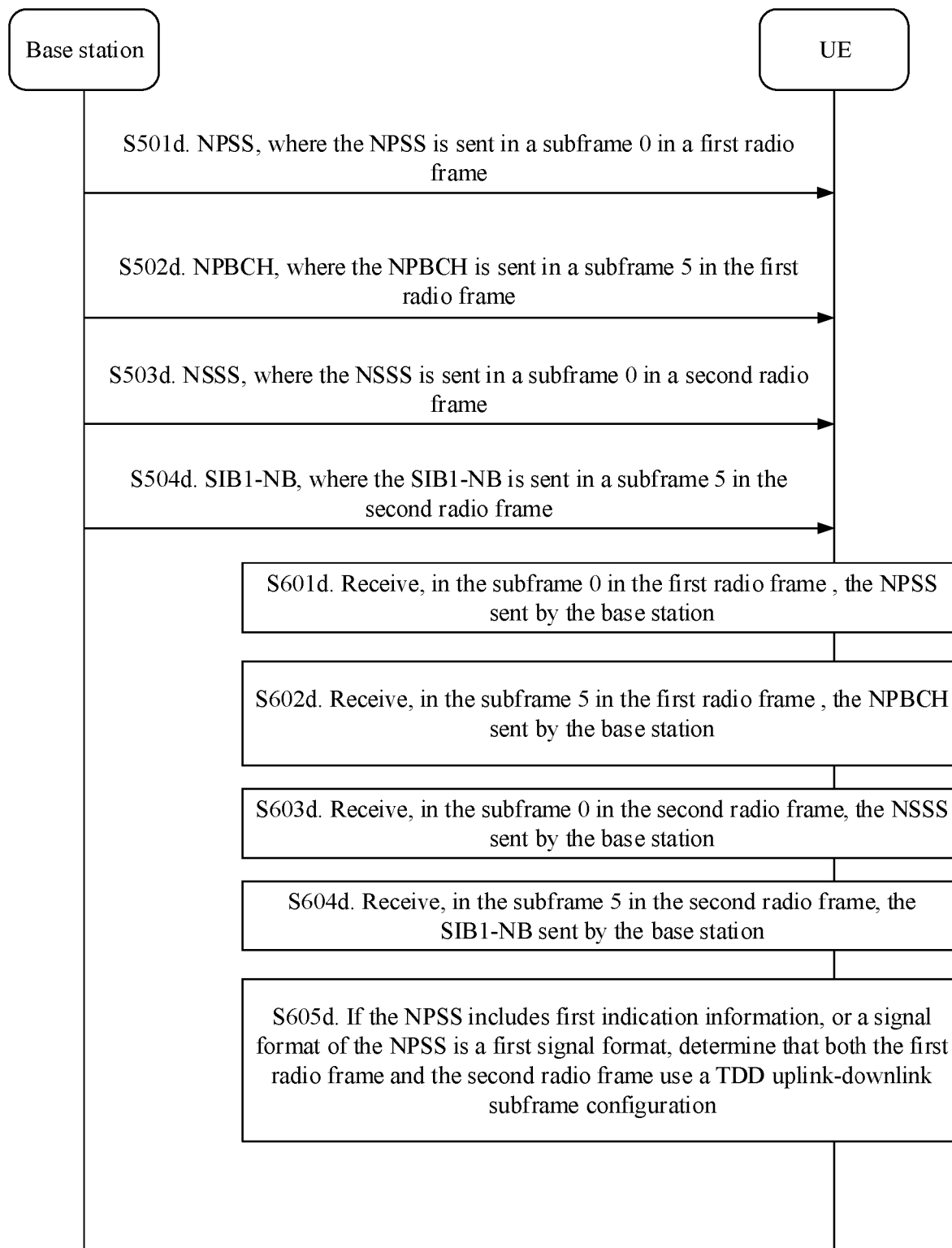
FIG. 13 is a schematic flowchart 6 of a data transmission method according to an embodiment of the present invention.

Specifically, when the base station sends an NPSS, or an NSSS, or an NPBCH, or a SIB1-NB to the UE by using a radio frame using the foregoing configuration 9, the data transmission method provided in this embodiment of the present invention may make reference to the foregoing step 501 to step 504 and step 601 to step 605. For example, as shown in FIG. 13, the data transmission method provided in this embodiment of the present invention may include step 501*d* to step 504*d*, and step 601*d* to step 605*d*.

S501*d*. The base station sends an NPSS to the UE by using a subframe 0 in a first radio frame.

S502*d*. The base station sends an NPBCH to the UE by using a subframe 5 in the first radio frame.

S503*d*. The base station sends an NSSS to the UE by using a subframe 0 in a second radio frame.

S504*d*. The base station sends a SIB1-NB to the UE by using a subframe 5 in the second radio frame.

S601*d*. The UE receives, in the subframe 0 in the first radio frame, the NPSS sent by the base station.

S602*d*. The UE receives, in the subframe 5 in the first radio frame, the NPBCH sent by the base station.

S603*d*. The UE receives, in the subframe 0 in the second radio frame, the NSSS sent by the base station.

S604*d*. The UE receives, in the subframe 5 in the second radio frame, the SIB1-NB sent by the base station.

S605*d*. If the NPSS includes first indication information, or a signal format of the NPSS is a first signal format, the UE determines that both the first radio frame and the second radio frame use a TDD uplink-downlink subframe configuration.

Certainly, the data transmission method shown in FIG. 13 may further perform the foregoing step 501' before step 501*d*.

S501'. The base station obtains the NPSS, the NSSS, the NPBCH, and the SIB1-NB.

Figure 14:
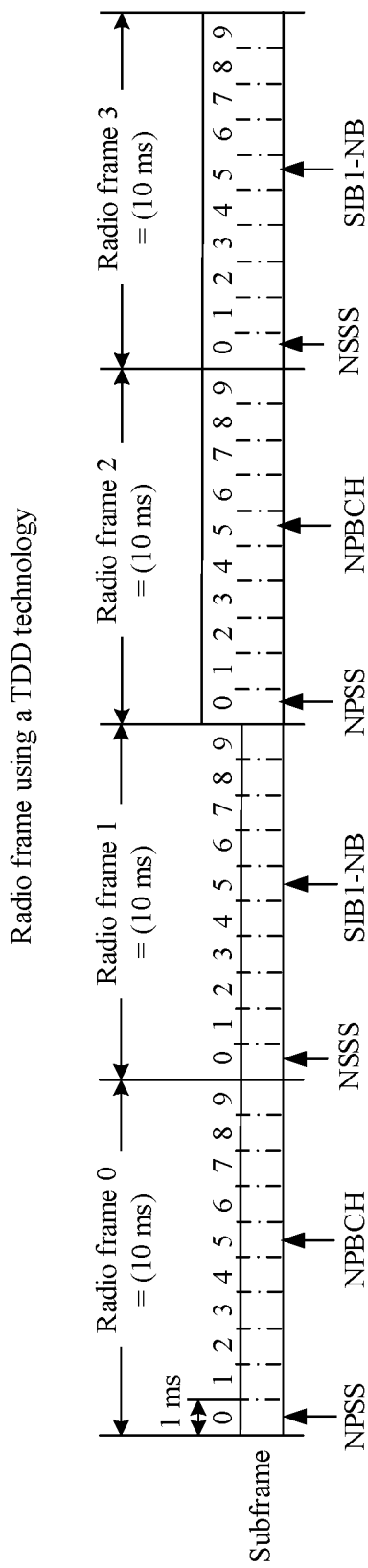
FIG. 14 is a schematic structural diagram 5 of a radio frame according to an embodiment of the present invention.

For example, FIG. 14 is a schematic structural diagram of still yet another radio frame according to this embodiment of the present invention. In FIG. 14, a radio frame 0 and a radio frame 2 may be the first radio frame, and a radio frame 1 and a radio frame 3 may be the second radio frame. A subframe 0 may be used to send the NPSS on a symbol 3 to a symbol 13 in the subframe 0. A subframe 1 and a subframe 6 in the radio frame 0 may be used to send the NPBCH on b symbols in a symbol 2 to a symbol 11 in the subframe 1 and c symbols in a symbol 3 to a symbol 11 in the subframe 6. The subframe 5 may be used to send the NSSS or the SIB1-NB on a symbol 3 to a symbol 13 in the subframe 5. Sending periods of the NPSS, the NSSS, the NPBCH, and the SIB1-NB are all 20 ms.

In this case, the data transmission method provided in this embodiment of the present invention may support all of the seven TDD uplink-downlink subframe configurations, and may implement flexibility in selecting an uplink-downlink subframe configuration when the base station sends the downlink signal to the UE.

According to a data transmission method provided in another embodiment of this application, a base station may alternatively send an NPSS, an NSSS, an NPBCH, and a SIB1-NB by using four subframes in one radio frame. Specifically, the base station may alternatively send the NPSS, the NSSS, the NPBCH, and the SIB1-NB by using a first subframe, a second subframe, a third subframe, and a fourth subframe in a first radio frame respectively.

For example, in a possible implementation, a combination of the first subframe, the second subframe, the third subframe, and the fourth subframe may be the following configuration:

Configuration 10: the first subframe is a subframe 0, the second subframe is a subframe 5, the third subframe is a subframe 8, and the fourth subframe is a subframe 9.

It can be figured out that, the configuration of the first subframe, the second subframe, the third subframe, and the fourth subframe may also be a configuration other than configuration 10. For example, the first subframe is a subframe 0, and the second subframe is a subframe 9. Details are not described in this embodiment of the present invention.

Figure 15:
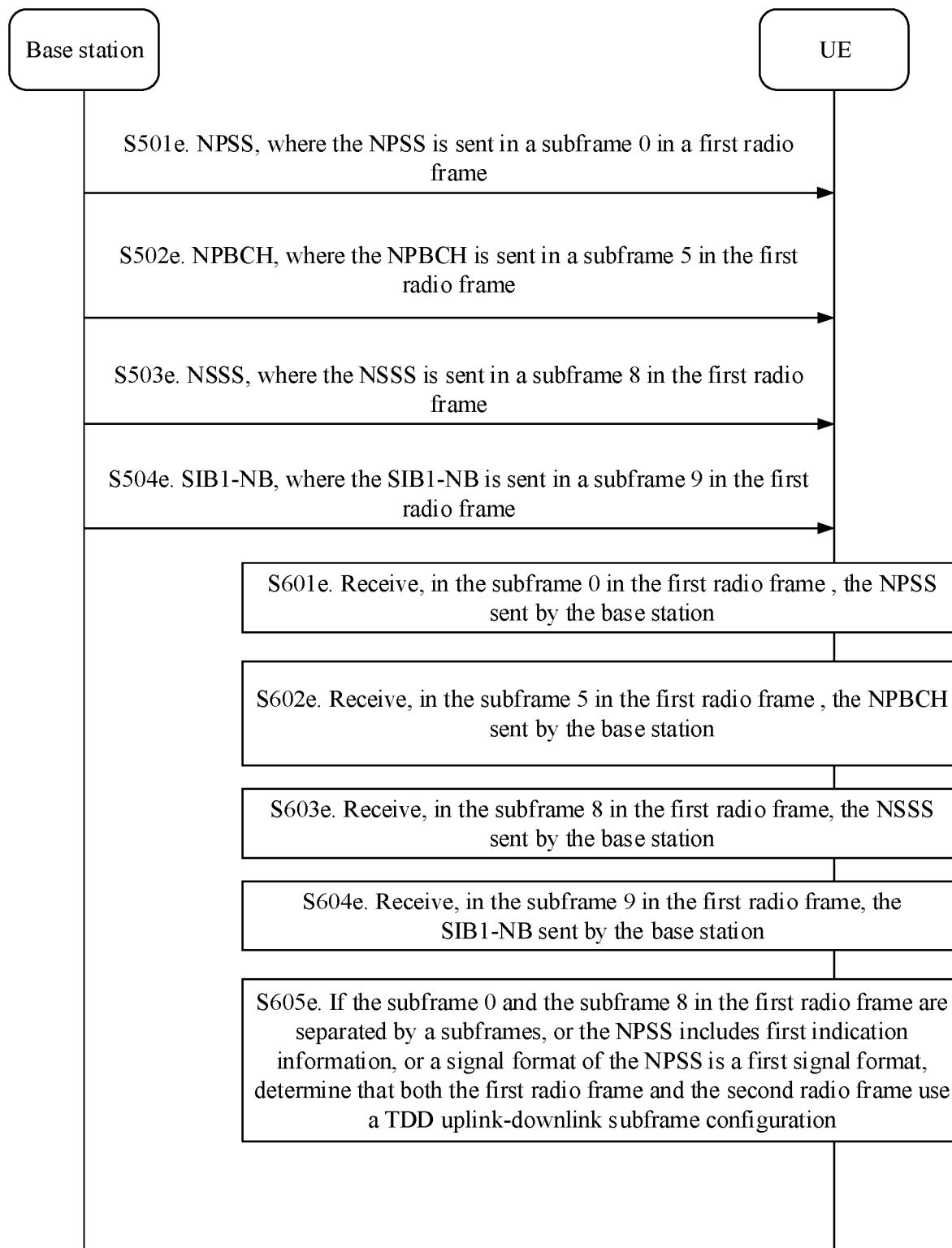
FIG. 15 is a schematic flowchart 7 of a data transmission method according to an embodiment of the present invention.

Specifically, when the base station sends an NPSS, or an NSSS, or an NPBCH, or a SIB1-NB to the UE by using a radio frame using the foregoing configuration 10, the data transmission method provided in this embodiment of the present invention may make reference to the foregoing step 501 to step 504 and step 601 to step 605. For example, as shown in FIG. 15, the data transmission method provided in this embodiment of the present invention may include step 501*e* to step 504*e*, and step 601*e* to step 605*e*.

S501*e*. The base station sends an NPSS to the UE by using a subframe 0 in a first radio frame.

S502*e*. The base station sends an NPBCH to the UE by using a subframe 5 in the first radio frame.

S503*e*. The base station sends an NSSS to the UE by using a subframe 8 in the first radio frame.

S504*e*. The base station sends a SIB1-NB to the UE by using a subframe 9 in the first radio frame.

S601*e*. The UE receives, in the subframe 0 in the first radio frame, the NPSS sent by the base station.

S602e. The UE receives, in the subframe 5 in the first radio frame, the NPBCH sent by the base station.

S603e. The UE receives, in the subframe 8 in the first radio frame, the NSSS sent by the base station.

S604e. The UE receives, in the subframe 9 in the first radio frame, the SIB1-NB sent by the base station.

S605e. If the subframe 0 and the subframe 8 in the first radio frame are separated by a subframes, or the NPSS includes first indication information, or a signal format of the NPSS is a first signal format, the UE determines that both the first radio frame and the second radio frame use a TDD uplink-downlink subframe configuration.

Certainly, the data transmission method shown in FIG. 15 may further perform the foregoing step 501' before step 501e.

S501'. The base station obtains the NPSS, the NSSS, the NPBCH, and the SIB1-NB.

Figure 16:
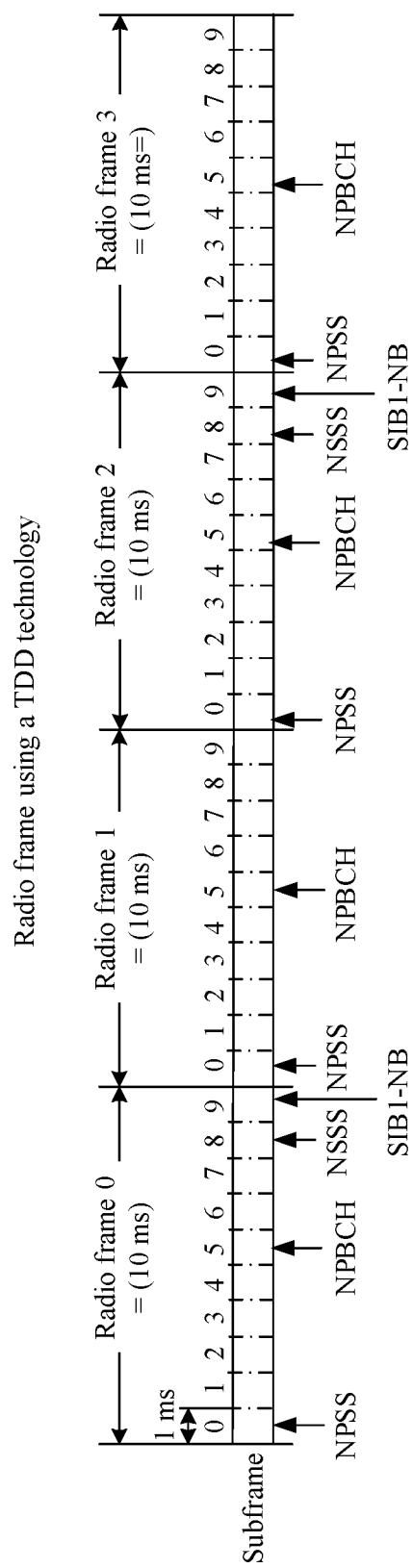
FIG. 16 is a schematic structural diagram 6 of a radio frame according to an embodiment of the present invention.

For example, FIG. 16 is a schematic structural diagram of a further radio frame according to this embodiment of the present invention. In FIG. 16, a radio frame 0, a radio frame 1, a radio frame 2, and a radio frame 3 each is the first radio frame. The subframe 0 may send the NPSS on a symbol 0 to a symbol 13 in the subframe 0. The subframe 5 may send the NPBCH on a symbol 3 to a symbol 13 in the subframe 5. The subframe 8 may send the NSSS on a symbol 3 to a symbol 13 in the subframe 8. The subframe 9 may send the SIB1-NB on a symbol 3 to a symbol 13 in the subframe 9. In addition, a period of sending each of the NPSS and the NPBCH is 10 ms, and a period of sending each of the SIB1-NB and the NSSS is 20 ms.

In this case, the data transmission method provided in this embodiment of the present invention may support the four TDD uplink-downlink subframe configurations: UL-DL (2), UL-DL (3), UL-DL (4), and UL-DL (5) shown in Table 1.

It should be noted that, in this embodiment of present invention, after receiving a downlink signal sent by the base station, the UE is enabled to detect the downlink signal on the symbol 3 to the symbol 13 in a subframe in which the downlink signal is located regardless of whether the subframe uses an HD-FDD technology or a TDD technology. In this way, complexity of detecting the NPSS, the NSSS, the NPBCH, and the SIB1-NB by the UE can be reduced.

The solutions provided in the embodiments of the present invention are mainly described above from a perspective of interaction between network elements. It can be understood that, to implement the foregoing functions, the network elements, for example, the base station and one or more UEs, include a corresponding hardware structure and/or software module performing the functions. A person skilled in the art should easily be aware that, in combination with the examples described in the embodiments disclosed in this specification, units, and algorithm steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of the present invention, modules of the base station and the UE may be divided based on the foregoing method examples. For example, the modules may be divided to correspond to the functions, or two or more functions may be integrated into one processing module. The integrated module may be implemented in a form of hardware, or may be implemented in a form of a software functional module. It should be noted that, in this embodiment of the present invention, module division is an example, and is merely a logical function division. In actual implementation, another division manner may be used.

Figure 17:
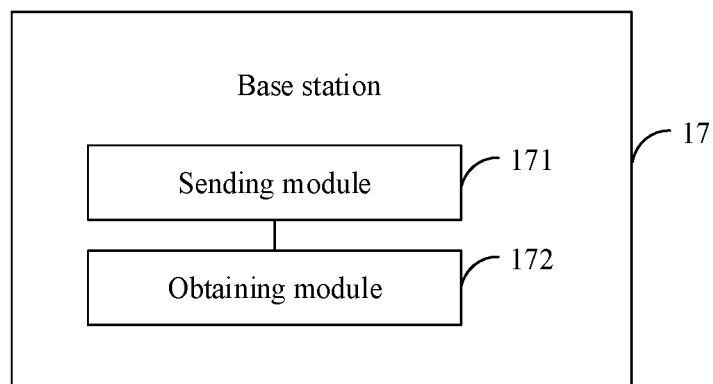
FIG. 17 is a schematic structural diagram 2 of a base station according to an embodiment of the present invention.

When the function modules are divided to correspond to the functions, FIG. 17 is a possible schematic structural diagram of the base station provided in the foregoing embodiments. As shown in FIG. 17, the base station 17 may include a sending module 171.

The sending module 171 is configured to support the base station 17 in performing step 501 to step 504, step 501a to step 504a, step 501b to step 504b, step 501c to step 504c, step 501d to step 504d, and step 501e to step 504e in the foregoing embodiment, and/or is configured to perform other processes of the technologies described in this specification.

It should be noted that the base station 17 shown in FIG. 17 may further include an obtaining module 172. The obtaining module 172 is configured to support the base station 17 in performing step 501' in the foregoing embodiment, and/or is configured to perform other processes of the technologies described in this specification.

When an integrated unit is used, the obtaining module 172 may be implemented by a processing module. The processing module may be a processor or a controller, for example, may be a CPU, a general-purpose processor, a digital signal processor (DSP), an application-specific integrated circuit (ASIC), a field programmable gate array (FPGA), another programmable logic device, a transistor logic device, a hardware component, or any combination thereof. The controller/processor may implement or execute various illustrations logical blocks, modules, and circuits described with reference to content disclosed in the present invention. The processing unit may be a combination implementing a computing function, for example, a combination of one or more microprocessors, or a combination of a DSP and a microprocessor. Certainly, the base station 17 may further include another function module, for example, a receiving module. The receiving module may be configured to receive an uplink signal sent by the UE. The sending module 171 and the receiving module may be integrated into one communications interface. A storage module may be a memory.

With reference to the base station shown in FIG. 3 in the foregoing embodiment, the processing module may be one or more processors such as the processor 31 and the processor 35 shown in FIG. 3. The storage module may be the memory 32 shown in FIG. 3. The sending module 171 may be implemented by the communications interface 33.

The communications bus 34 may be specifically a peripheral component interconnect (PCI) bus, an extended industry standard architecture (EISA) bus, or the like. The foregoing communications bus 34 may be classified into an address bus, a data bus, a control bus, and the like. This is not limited in this embodiment of the present invention.

It should be noted that, for detailed descriptions of the modules in the base station 17 provided in this embodiment of the present invention and technical effects brought after the modules perform related method steps in the foregoing embodiments, refer to related descriptions in the method embodiments of the present invention. Details are not described herein again.

Figure 18:
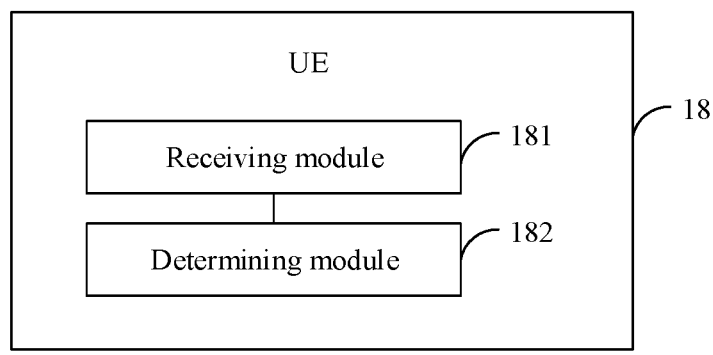
FIG. 18 is a schematic structural diagram 2 of UE according to an embodiment of the present invention.

When the function modules are divided to correspond to the functions, FIG. 18 is a possible schematic structural diagram of the UE provided in the foregoing embodiments. As shown in FIG. 18, the UE 18 may include a receiving module 181 and a determining module 182.

The receiving module 181 is configured to support the UE 18 in performing step 601 to step 604, step 601a to step 604a, step 601b to step 604b, step 601c to step 604c, step 601d to step 604d, and step 601e to step 604e in the foregoing embodiment, and/or is configured to perform other processes of the technologies described in this specification. The determining module 182 is configured to support the UE 18 in performing step 605, step 605a, step 605b, step 605c, step 605d, step 605e, and step 606 in the foregoing embodiments, and/or is configured to perform other processes of the technologies described in this specification.

When an integrated unit is used, the determining module 182 may be implemented by a processing module. The foregoing processing module may be a processor or a controller, for example, may be a CPU, a general purpose processor, a DSP, an ASIC, an FPGA, or another programmable logic device, a transistor logic device, a hardware component, or any combination thereof. The controller/processor may implement or execute various illustrations logical blocks, modules, and circuits described with reference to content disclosed in the present invention. The processing unit may be a combination implementing a computing function, for example, a combination of one or more microprocessors, or a combination of the DSP and a microprocessor. Certainly, the UE 18 may further include another function module, for example, a sending module. The sending module may be configured to send an uplink signal to a base station. The receiving module 181 and the sending module may be integrated into one communications interface. A storage module may be a memory.

With reference to the UE shown in FIG. 4 in the foregoing embodiment, the processing module may be one or more processors such as the processor 41 and the processor 45 shown in FIG. 4. The storage module may be the memory 42 shown in FIG. 4. The receiving module 181 may be implemented by the communications interface 43.

The communications bus 44 may be specifically a PCI bus, an EISA bus, or the like. The foregoing communications bus 44 may be classified into an address bus, a data bus, a control bus, and the like. This is not limited in this embodiment of the present invention.

It should be noted that, for detailed descriptions of the modules in the UE 18 provided in this embodiment of the present invention and technical effects brought after the modules perform related method steps in the foregoing embodiments, refer to related descriptions in the method embodiments of the present invention. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data transmission method, comprising:
sending, by a base station, a narrowband primary synchronization signal (NPSS) to user equipment (UE) using a subframe 5 in a first radio frame and a subframe 5 in a second radio frame, wherein the first radio frame and the second radio frame are consecutive, and both the first radio frame and the second radio frame use a time division duplex (TDD) uplink-downlink subframe configuration;
sending, by the base station, a narrowband physical broadcast channel (NPBCH) to the UE using a subframe 9 in the first radio frame and a subframe 9 in the second radio frame;
sending, by the base station, a narrowband secondary synchronization signal (NSSS) to the UE using a subframe 0 in the first radio frame; and
sending, by the base station, a system information block Type1-NB (SIB1-NB) to the UE using a subframe 0 in the second radio frame.

2. The method according to claim 1, wherein, in the first radio frame and the second radio frame, the subframe 5, the subframe 9, and the subframe 0 each are a downlink subframe.

3. The method according to claim 1, wherein the NPSS comprises first indication information, and the first indication information indicates that both the first radio frame and the second radio frame use the TDD uplink-downlink subframe configuration.

4. The method according to claim 1, further comprising:
receiving, by the UE in the subframe 5 in the first radio frame and the subframe 5 in the second radio frame, the NPSS from the base station;
receiving, by the UE in the subframe 9 in the first radio frame and the subframe 9 in the second radio frame;
receiving, by the UE in the subframe 0 in the first radio frame, the NSSS from the base station;
receiving, by the UE in the subframe 0 in the second radio frame, the SIB1-NB from the base station; and
determining, by the UE, that both the first radio frame and the second radio frame use the TDD uplink-downlink subframe configuration.

5. A data transmission method, comprising:
receiving, by user equipment UE in a subframe 5 in a first radio frame and a subframe 5 in a second radio frame, a narrowband primary synchronization signal (NPSS) from a base station, wherein the first radio frame and the second radio frame are consecutive;
receiving, by the UE in a subframe 9 in the first radio frame and a subframe 9 in the second radio frame, a narrowband physical broadcast channel (NPBCH) from the base station;
receiving, by the UE in a subframe 0 in the first radio frame, a narrowband secondary synchronization signal (NSSS) from the base station;
receiving, by the UE in a subframe 0 in the second radio frame, a system information block Type1-NB (SIB1-NB) from the base station; and
determining, by the UE, that both the first radio frame and the second radio frame use a time division duplex (TDD) uplink-downlink subframe configuration.

6. An apparatus, comprising:
at least one processor coupled to a non-transitory memory and configured to execute instructions stored in the non-transitory memory, wherein the instructions cause the apparatus to:
receive, in a subframe 5 in a first radio frame and a subframe 5 in a second radio frame, a narrowband primary synchronization signal (NPSS) from a base station, wherein the first radio frame and the second radio frame are consecutive;
receive, in a subframe 9 in the first radio frame and a subframe 9 in the second radio frame, a narrowband physical broadcast channel (NPBCH) from the base station;
receive, in a subframe 0 in the first radio frame, a narrowband secondary synchronization signal (NSSS) from the base station;
receive, in a subframe 0 in the second radio frame, a system information block Type1-NB (SIB1-NB) from the base station; and
determine that both the first radio frame and the second radio frame use a time division duplex (TDD) uplink-downlink subframe configuration.

7. The apparatus according to claim 6, wherein the apparatus is user equipment.

8. The apparatus according to claim 6, wherein a signal format of the NPSS is a first signal format, and the first signal format indicates that both the first radio frame and the second radio frame use the TDD uplink-downlink subframe configuration.

9. An apparatus, comprising:
at least one processor coupled to a non-transitory memory and configured to execute instructions stored in the non-transitory memory, wherein the instructions cause the apparatus to:
send a narrowband primary synchronization signal (NPSS) to user equipment (UE) using a subframe 5 in a first radio frame and a subframe 5 in a second radio frame, wherein the first radio frame and the second radio frame are consecutive, and both the first radio frame and the second radio frame use a time division duplex (TDD) uplink-downlink subframe configuration;
send a narrowband physical broadcast channel (NPBCH) to the UE using a subframe 9 in the first radio frame and a subframe 9 in the second radio frame;
send a narrowband secondary synchronization signal (NSSS) to the UE using a subframe 0 in the first radio frame; and
send a system information block Type1-NB (SIB1-NB) to the UE using a subframe 0 in the second radio frame.

10. The apparatus according to claim 9, wherein the apparatus is a base station.

11. A data transmission system, comprising a base station and user equipment (UE),
wherein the base station is configured to:
send a narrowband primary synchronization signal (NPSS) to the UE using a subframe 5 in a first radio frame and a subframe 5 in a second radio frame, wherein the first radio frame and the second radio frame are consecutive, and both the first radio frame and the second radio frame use a time division duplex (TDD) uplink-downlink subframe configuration;
send a narrowband physical broadcast channel (NPBCH) to the UE using a subframe 9 in the first radio frame and a subframe 9 in the second radio frame;
send a narrowband secondary synchronization signal (NSSS) to the UE using a subframe 0 in the first radio frame; and
send a system information block Type1-NB (SIB1-NB) to the UE using a subframe 0 in the second radio frame; and
wherein the UE is configured to:
receive, in the subframe 5 in the first radio frame and the subframe 5 in the second radio frame, the NPSS from the base station;
receive, in the subframe 9 in the first radio frame and the subframe 9 in the second radio frame, the NPBCH from the base station;
receive, in the subframe 0 in the first radio frame, the NSSS from the base station;
receive, in the subframe 0 in the second radio frame, the SIB1-NB from the base station; and
determine that both the first radio frame and the second radio frame use the TDD uplink-downlink subframe configuration.

\* \* \* \* \*

UNITED STATES PATENT AND TRADEMARK OFFICE
CERTIFICATE OF CORRECTION

PATENT NO. : 11,356,221 B2
APPLICATION NO. : 16/786501
DATED : June 7, 2022
INVENTOR(S) : Li et al.

It is certified that error appears in the above-identified patent and that said Letters Patent is hereby corrected as shown below:

In the Claims

Claim 5: Column 35, Line 24: "receiving, by user equipment UE in a subframe 5 in a first" should read -- receiving, by user equipment (UE) in a subframe 5 in a first --.

Signed and Sealed this
Ninth Day of April, 2024

Katherine Kelly Vidal
*Director of the United States Patent and Trademark Office*